CLAYTON V. FRENCH
STANLEY E. JASTRZEMSKI
JAMES E. NEAL
NORMAN S. GREINER
PAUL L. EARLE
FRED T. RANDOLPH
        INVENTORS

BY
ATTORNEY

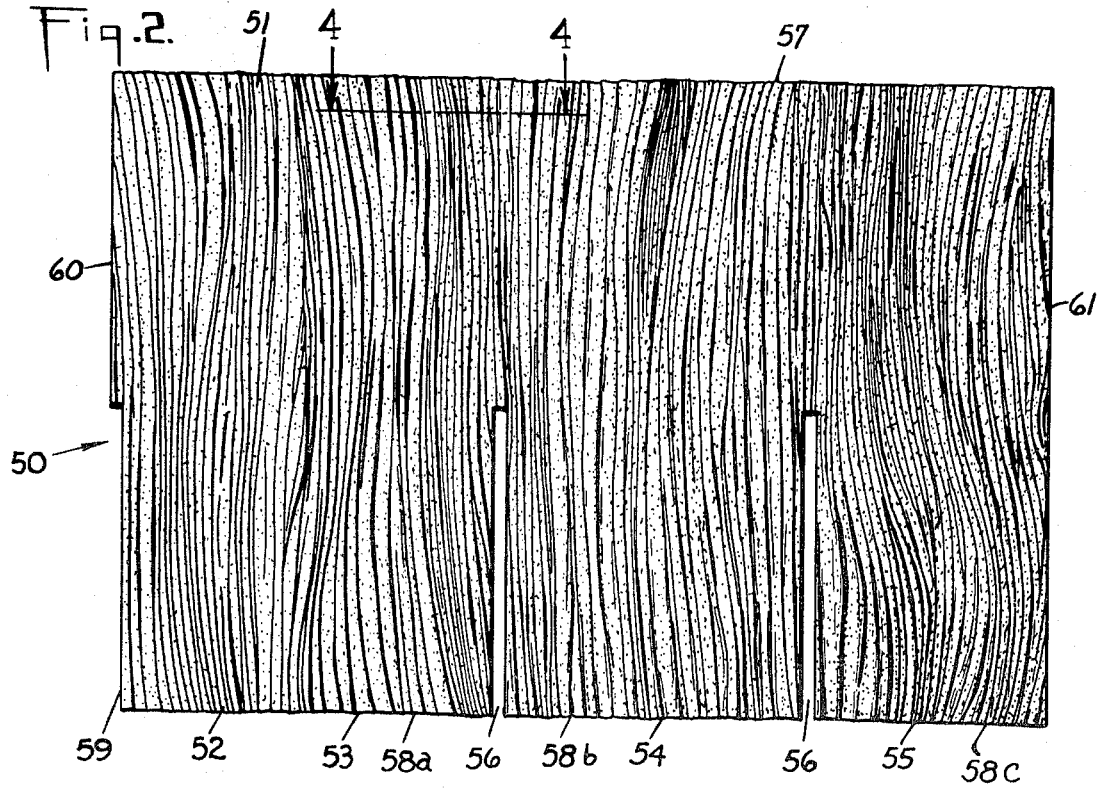
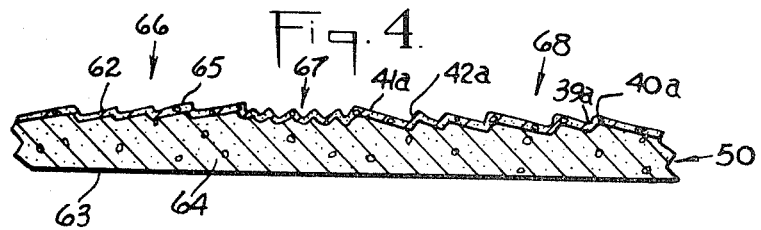
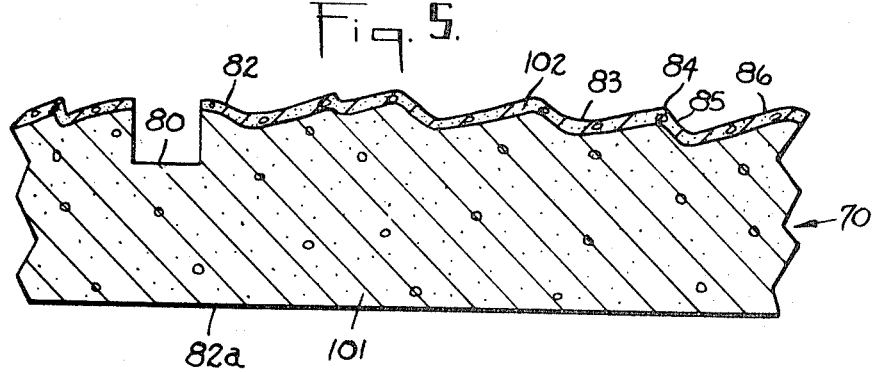

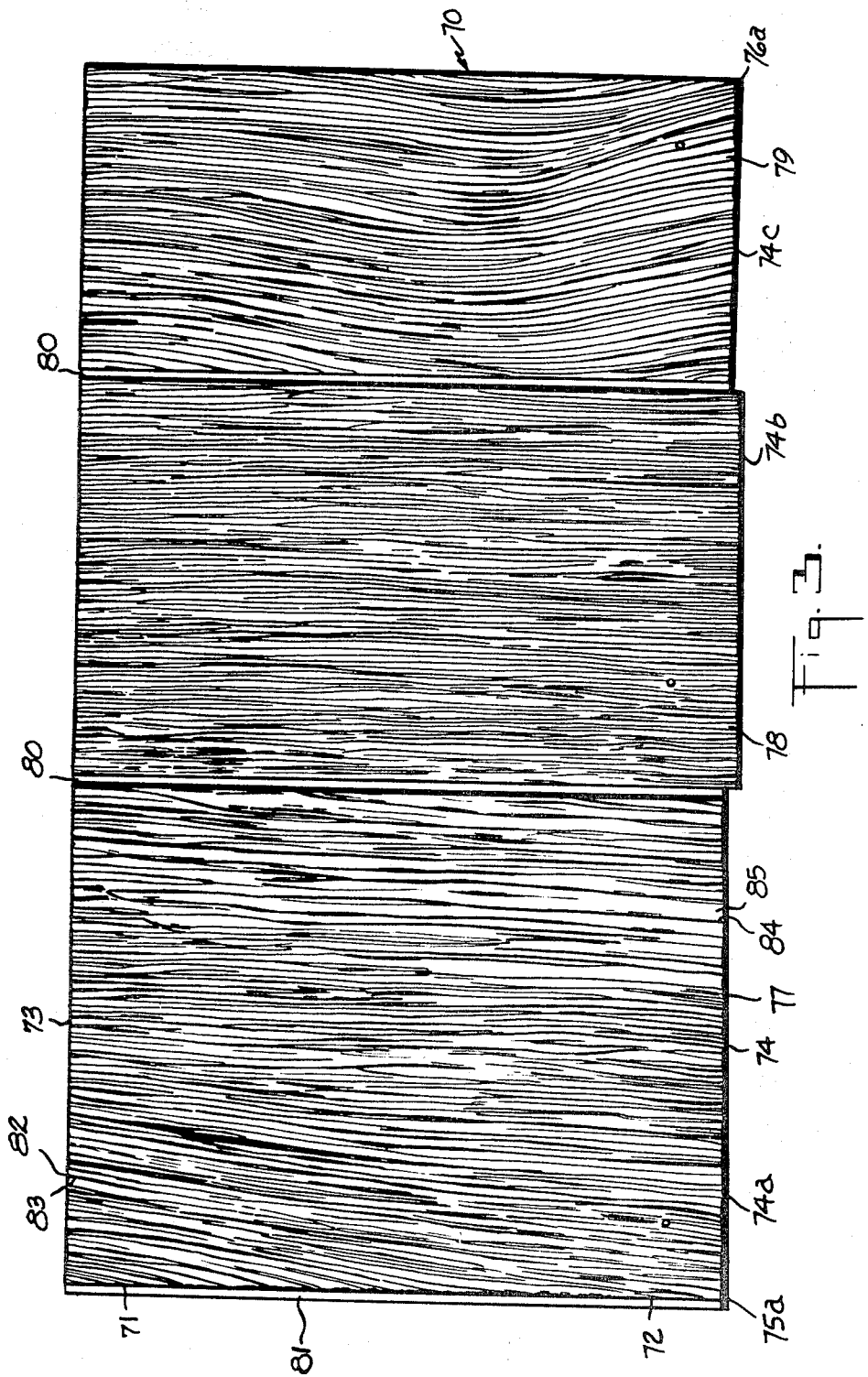

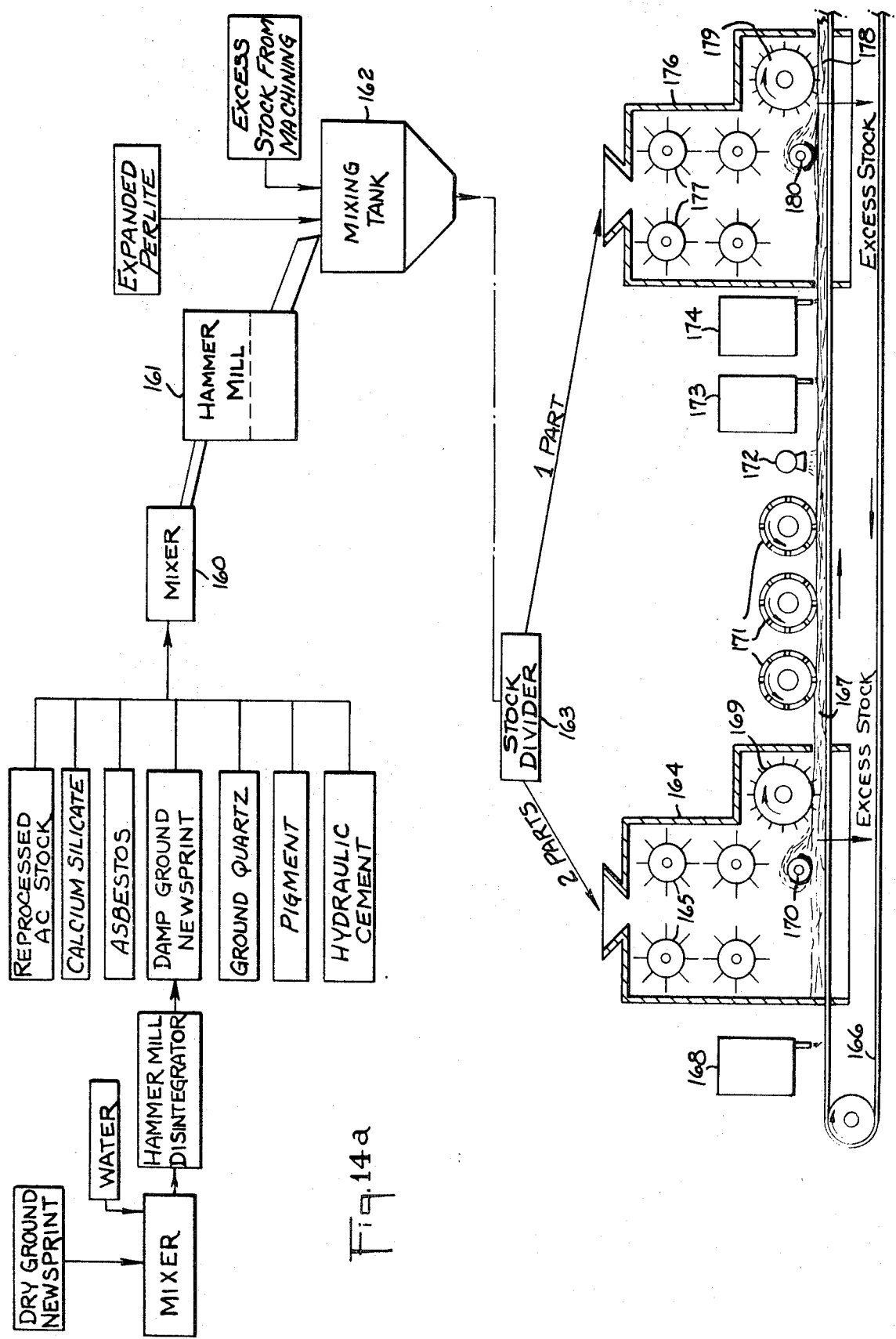

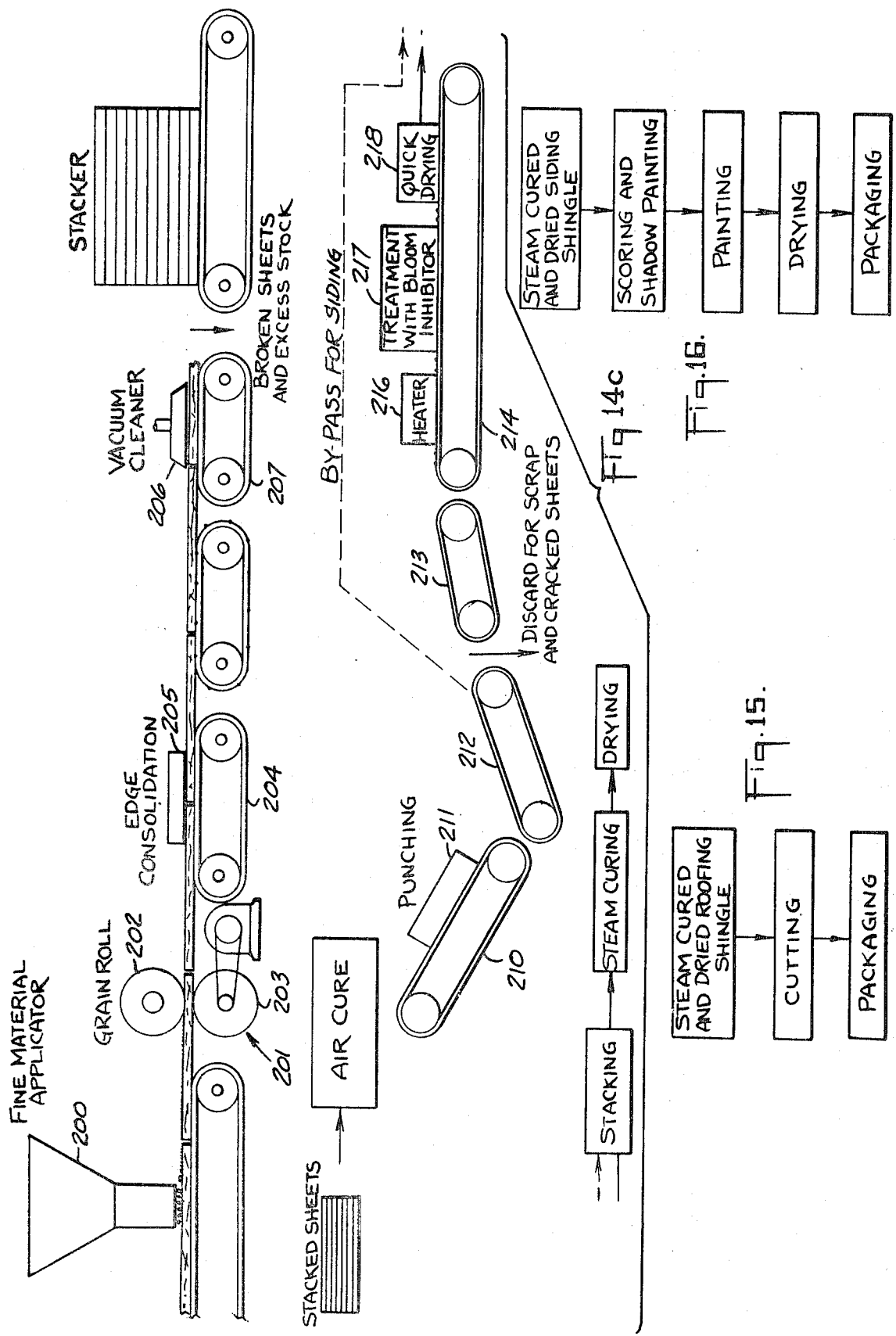

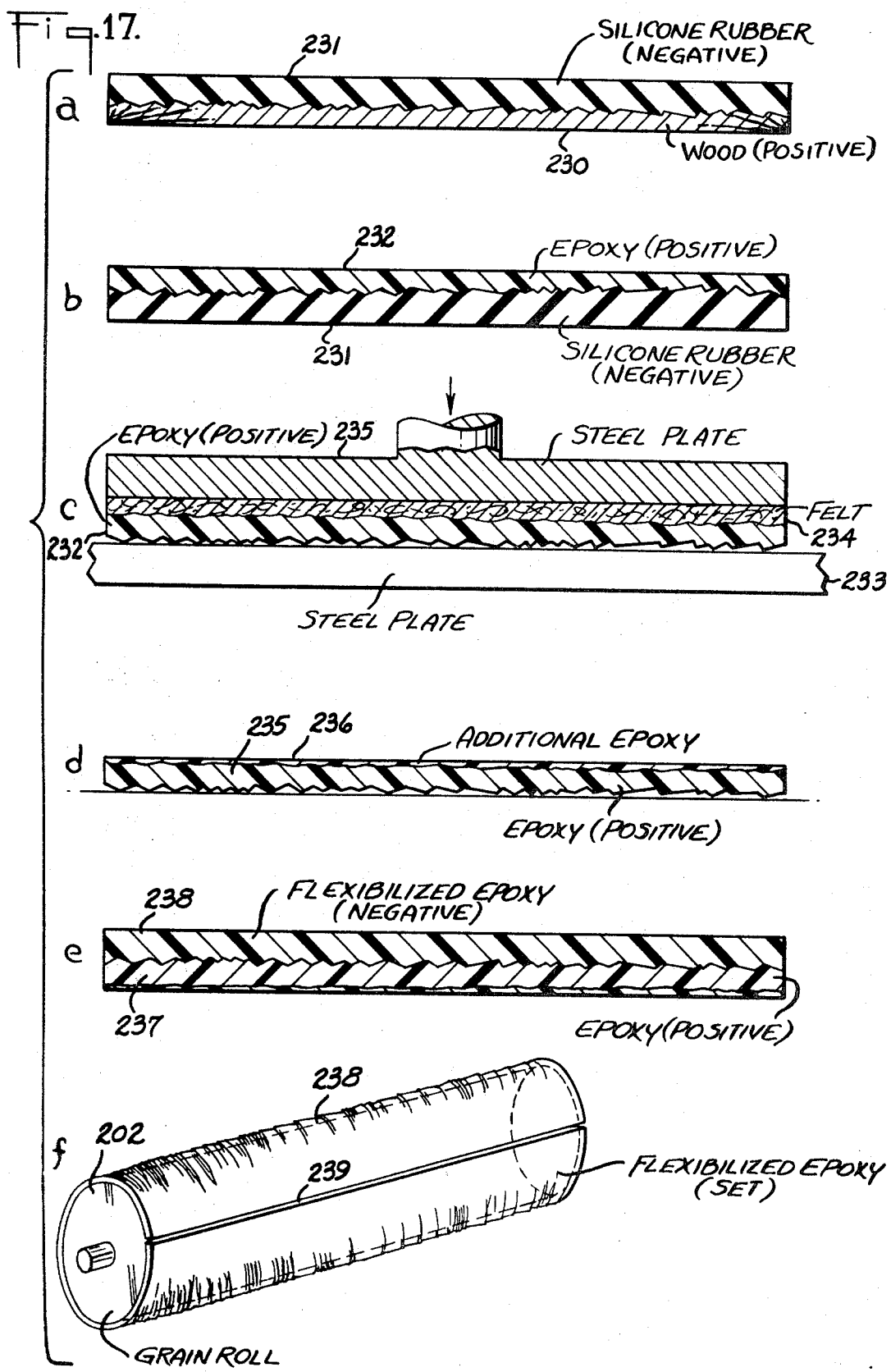

United States Patent Office 3,608,261
Patented Sept. 28, 1971

3,608,261
SHEET COVERING MEMBERS FOR
BUILDING SURFACES
Clayton V. French, Somerville, Stanley E. Jastremski, Bound Brook, James E. Neal, North Plainfield, Norman S. Greiner, Somerville, Paul L. Earle, Martinsville, and Fred T. Randolph, Somerville, N.J., assignors to Johns-Manville Corporation, New York, N.Y.
Continuation of application Ser. No. 598,772, Dec. 2, 1966. This application Mar. 28, 1969, Ser. No. 812,963
Int. Cl. B44f 9/02; E04c 2/04
U.S. Cl. 52—316
11 Claims

ABSTRACT OF THE DISCLOSURE

This invention relates to sheet covering members for building surfaces and especially to asbestos-cement shingles and strips for roofing and siding. The covering members each comprise a base member and a denser veneer covering on said base. The covering members can be textured to simulate a natural wood grain.

---

This application is a continuation of Ser. No. 598,772, filed Dec. 2, 1966, now abandoned.

The exterior covering members for the sides and roofs of houses and various other buildings serve a twofold purpose. First, the covering affords protection against the weather. Second, the covering should present a pleasing appearance. The latter is an important function of the sidewall covering of all buildings, and is also an important function of the roofing material for houses and other low buildings having pitched roofs which can be readily seen from the ground.

Shingles have been widely used for many years for both siding and roofing on houses and other low buildings. The wooden shingle is one of the oldest known forms of shingles. Various woods, and especially red cedar, are used in the manufacture of wooden shingles. After the log has been sawed into the desired lengths, shingles are produced, as by hand splitting, or by machine splitting, or by a combination of hand splitting and sawing. Typically, the logs are hand split in the direction of the grain. Hand splitting gives a textured surface characterized by alternating grooves and ridges formed by the grain of the wood. In some shingles, these ridges lie very nearly in a common plane. Other shingles, however, also include bold undulations having a width several times the distance between successive wood rings, on which the wood grain texture is superimposed. Both types of surfaces may be produced by hand splitting. Both types of surfaces are highly regarded by many for their pleasing appearance. The typical hand split wood shingle is fairly thick, usually at least ⅜ of an inch at the butt edge and in some cases as much as 1¼ inches at the butt edge. The shingle may either have the same thickness at the head and butt edges or may be tapered with the thicker edge being used as the butt edge. Wooden shingles may be laminated to achieve a desired thickness. Both the thick butt edge and the textured exterior surface contribute to the pleasing appearance of wooden shingles. When the sunlight strikes a shingled siding from an elevated angle, a deep and jagged shadow line is cast by the butt edges of each course of shingles on the course below. A thick shingle is essential to get a deep shadow line, and the textured surfaces of both courses of shingles give the jagged effect. The appearance of wooden shingles, which is highly regarded by many, continues to make wooden shingles popular for both siding and roofing.

Wooden shingles have several disadvantages. One is their high cost. Aside from cost, other disadvantages include the susceptibility to rot, warping, curling, and attack by termites. Wood shingles exposed to sunlight dry out and may split or curl with resulting leakage. Wooden shingles are highly absorbent to water, and constant swelling and shrinking cause early paint failure, so that they do not have a good surface for repainting. Painted shingles require frequent repainting. Cedar contains resins that may cause paint failure within a period as short as one year. For this reason, wooden shingles are often stained instead of painted. However, staining is generally not as good as painting from the standpoint of weather protection, curling or erosion, and the range of color is limited.

Another serious drawback of wooden shingles is their combustibility. Not only are wooden shingles combustible, but they may be dislodged by thermal air currents during a fire and carried as burning brands to other locations, starting new fires.

Still other disadvantages of wooden shingles include splitting, blistering, peeling, and shrinking. Because of the manner in which they are made and their susceptibility to splitting, it is not feasible to make them in strip form with slots or grooves cut in them, and without reinforcement by a backing sheet or the like to provide separate areas of the exposed butt portion of the strip to give the desirable appearance of a plurality of individual shingles with the convenience of handling and applying only one.

Asbestos-cement shingles, which are a more recent development in the shingle art, possess numerous qualities which are superior to those of wooden shingles. Asbestos-cement shingles are incombustible, more dimensionally stable, and in general much less susceptible to weathering than wooden shingles. They will not rot, curl, or blister. They are not prone to attack by termites. Their incombustibility is a major advantage, for buildings having asbestos-cement shingle siding and roofing are much less vulnerable to fires than those having wooden shingle siding or roofing. Asbestos-cement shingles have a longer life than wooden shingles, and in many cases also have a lower initial cost.

Typical asbestos-cement shingles of present day commerce have a few disadvantages. They cannot readily be nailed or sawed with ordinary hand saws because of their hardness. The absence of nailability requires that nail holes be provided, and the need for nail holes limits the type of construction over which they are to be applied. The absence of sawability is undesirable because it is convenient to saw shingles at the construction site, particularly for fitting shingles at the edge of a sidewall or roof. However, many consider the major disadvantage of asbestos-cement shingles to be aesthetic. Although asbestos-cement shingles are functionally superior to wooden shingles in many ways, their appearance is frequently regarded as less pleasing than the appearance of wooden shingles. Two of the desirable characteristics of wooden shingles from the standpoint of appearance, namely butt edge thickness and surface texture interest, are not achieved in commercial asbestos-cement shingles. Asbestos-cement shingles for commerce are quite dense, commonly having a density in the range of about 90 to 120 pounds per cubic foot. The use of asbestos-cement of such high density has been necessary because lower density asbestos-cement is prone to erosion by weather and to chipping, cracking, marring by abrasion, and other damage in the ordinary course of shipping and installation. Low density asbestos-cement also possesses a poor paint surface, and high moisture absorptivity. A high density asbestos-cement shingle must be much thinner than the thick wooden shingles possessing the most pronounced texture interest, in order to avoid excessive weight and material cost. For this reason, commercial asbestos-cement shingles are commonly quite thin, for example, on the order of 0.15 to 0.20 inch. The thinness of asbestos-cement shingles makes it difficult to form a deep surface texture. A simulated wood grain pattern has been produced on the surface of a thin asbestos-cement shingle, but the texture was so shallow as to be barely discernible at normal viewing distance. Somewhat deeper textures in thin asbestos-cement shingles have been produced on occasion, but these have been limited to very simple patterns, such as a plurality of parallel grooves extending from the head edge to the butt edge. As a consequence of their thinness and lack of surface texture, asbestos-cement shingles cast a thin, regular shadow which does little to enhance the appearance of the building surface to which they are applied as a covering.

A further disadvantage of certain conventional asbestos-cement shingles, and especially some of the lower density shingles on the market, is the comparative absence of freeze-thaw stability. Consequently, these lower density shingles have not achieved popularity for exterior covering, and particularly for roofing. Freeze-thaw stability is highly important for roofing shingles, since the roof may be subjected to alternate freezing and thawing by snow which collects on the roof and then melts and refreezes with changes in temperature. Low density asbestos-cement shingles made by present day commercial wet process have an inherent tendency to lack freeze-thaw stability. In general, the conventional wet processes employed for years in the production of typical thin, dense asbestos-cement shingles involve the initial formation of a relatively dilute aqueous slurry, followed by the draining or withdrawing or expressing of most of the excess water from the solids. Typically, as in the well known Hatschek process, the solids are collected and consolidated in layer increments on the external periphery of a large rotating cylinder, referred to as an accumulator roll, and the wet stock is stripped from the roll as a sheet which is then processed into shingles. Texture may be applied to the surface of the sheet formed by the first layer of stock built up on the accumulator roll, or may be applied after the sheet is removed from the accumulator roll. Because of the forming of the stock in layers on the accumulator roll, the wet processes produce sheets consisting of a plurality of laminae. Few, if any, asbestos fibers extend from one lamina to an adjacent lamina. Hence, the planes which mark the boundaries between adjacent laminae are planes of weakness, and in the low density shingles rupture is prone to occur at these planes during alternate freezing and thawing of the sheet.

The dry process of making asbestos-cement shingles has seen commercial use for many years. The dry process is disclosed in various United States patents, for example, Nos. 2,230,880; 2,401,663; 2,445,210; 2,446,782; 2,859,484; and 2,886,484. In the dry process, a relatively dry mix of the solids is laid down in considerable thickness on a conveyor belt and much of the water to be included in the mix is then added, and the stock is consolidated by pressure rolls, as it moves along on the conveyor. While this procedure does not have the inherent tendency of typical wet processes to produce a laminar structure, it does pose problems of getting the water well distributed into and throughout the stock. In general, the thicker the stock, the more difficult it is to obtain uniform distribution of the water throughout the stock. Much reliance has been placed on the use of high press roll pressures to force the water into the stock. It generally follows that the more pressure is applied the greater is the consolidation and densification of the stock, and the denser and thinner the final product. The techniques as developed prior to the present invention (see, for example, Pat. No. 2,859,484) have worked effectively in the production of the typical thin, dense asbestos-cement shingles which have been marketed through the years, but the established techniques were not adequate to produce thick, low density asbestos-cement shingles, especially when highly textured with deep grooves and other texture contours simulating, for example, hand split wood shingles. Since in the production of these thick, low density asbestos-cement shingles, the stock is laid down in a very considerable thickness on the forming conveyor, the problems of obtaining uniform distribution of the amount of water needed in the stock without the use of high roll pressures, over densification of the stock and distortion of the surface texture are serious ones and are made worse by the required inclusion in the stock formulation of certain ingredients not included in the typical thin, dense asbestos-cement shingles made by the dry process. For example, one of these ingredients, cellulosic fibers, could not be satisfactorily opened and dispersed in the dry mix by conventional techniques and tended to remain in clumps in the stock leading to undesirable non-uniformity in the mix, both as to the distribution of the cellulosic fibers and the water.

The ideal shingle would combine the good qualities of both wood and asbestos-cement shingles including a commercially attractive price. Among the desirable qualities in a shingle are the following:

(1) Incombustibility.
(2) Resistance to erosion and other weathering action.
(3) Freedom from rotting, termite attack, warping, and curling.
(4) Strength and cohesiveness sufficient to prevent chipping and cracking in the ordinary course of handling and installation.
(5) A surface which affords long paint life.
(6) Nailability and sawability.
(7) Dimensional stability.
(8) Freeze-thaw resistance.
(9) Pleasing appearance; e.g., varied, deep texture, and thick, rugged appearance.
(10) Lightweight.
(11) Not excessive cost.

Attempts have been made, prior to this invention, to make building covering members which would possess at least some of the good qualities of both wood and asbestos-cement, but these attempts have met with only limited success. The problem of achieving complete or even substantially complete success has continued to defy solution and in fact to appear unsolvable.

An object of this invention is to provide asbestos-cement building covering members which possess substantially the desirable qualities of both asbestos-cement and wood shingles, without the disadvantages of either.

Another object of this invention is to provide asbestos-cement building covering members which combine the usual desirable characteristics of asbestos-cement shingles with a good appearance similar to that of wood shingles, plus having better nailability and sawability characteristics than the usual dense commercial asbestos-cement shingles.

A further object of this invention is to provide building covering members having a simulated wood grain pattern including grooves, in which at least a portion of the grooves forming the wood grain pattern are modified so that different members or different parts of the same member have different light reflectance characteristics.

A further object of this invention is to produce an asbestos-cement shingle having substantial butt edge thickness, low density, and a deeply textured exterior surface.

A further object of this invention is to provide an asbestos-cement shingle having good freeze-thaw stability.

A further object of this invention is to provide an improved dry process for making asbestos-cement shingles.

Other objects and advantages of this invention will be apparent from the description which follows.

The asbestos-cement building covering members of this invention are typified by shingles. They comprise an asbestos-cement base having a density in the range of 35–70 pounds per cubic foot, and a thin veneer having a density of about 80 to 120 pounds per cubic foot on the front face thereof. The overall density of this shingle is about 40 to about 75 pounds per cubic foot. This is a low overall density compared to most asbestos-cement shingles making it possible to produce shingles which are substantially thicker than the usual thin, dense asbestos-cement shingles which are typical in the trade and still retain lightness in overall weight. The asbestos-cement shingles of this invention are at least 0.25 inch thick at the butt edge, and preferably not less than about 0.35 inch thick.

To achieve low density, nailability, and sawability while maintaining satisfactory strength and weather resistance, a new shingle composition was required. The novel base is a hydrothermal reaction product of a mixture comprising about 3 to 30 percent by weight of asbestos fibers, 25 to 45 percent by weight of hydraulic cement, 10 to 25 percent by weight of silica, 5 to 20 percent by weight of cellulose, and 5 to 20 percent by weight of expanded perlite, based on the total dry solids weight of raw material base furnish. The base may also contain calcium silicate and diatomaceous earth. The veneer is a hydrothermal reaction product of about 3 to 30 percent by weight of asbestos fibers, 25 to 45 percent by weight of hydraulic cement, and 10 to 25 percent by weight silica, based on the total dry solids weight of raw material veneer furnish. The base furnish contain about 60 to 90 percent by weight of a raw material furnish of the above indicated composition, plus conversely about 10 to 40 percent by weight of rework asbestos-cement. Adjacent ridges, like adjacent grains in natural wood grain, are generally parallel without being precisely parallel or equally spaced apart throughout their entire length.

The simulated wood grain texture herein differs from natural wood grain textures in the deliberate inclusion of asymmetrical grooves on a predetermined basis. Asymmetrical grooves are those in which one of the two flanks forming the groove is wider and less steeply inclined than the other. The direction in which the wider flanks of the grooves face has a marked influence on the light reflectance characteristics of the shingle. Different light reflectance characteristics can be imparted to different portions of the shingle surface by providing asymmetrical grooves in at least one portion of the shingle.

The shingles of this invention have a deep surface texture which heightens their aesthetic appeal. The preferred texture pattern is essentially a simulated wood grain pattern with modifications which enhance the appearance of the shingle. The texture pattern is formed by alternating grooves and ridges with flanks connecting the grooves with the adjacent ridges.

Both siding and roofing shingles can be made in strips each having a plurality of tabs simulating individual shingles. Appropriate tab separators give the appearance of a joint between two adjacent shingles. Roofing shingles may have cutouts in the butt portion between adjacent tabs. Siding shingles may have rectangular channels running from the head edge to the butt edge to separate adjacent tabs. The appearance of separate shingles is aided by having nonparallel grains in the two adjacent tabs in the vicinity of the channel.

Further differentiation between the tabs of the shingle, as well as increased visual appeal, may be provided in siding shingles of this invention by having symmetrical grooves in one of the tabs and asymmetrical grooves in the others.

Shingles of this invention may be laid in courses on both sidewalls and roofs according to conventional shingle laying patterns. Conventional siding and roofing underlayments may be used.

Although shingles of this invention can be made by either a wet process or a dry process, the latter is preferred for a number of reasons, notably because of the greater freeze-thaw stability in the resulting shingle. In the dry process of this invention, the ingredients of the raw material furnish, i.e., asbestos fibers, cement, silica, wet fiberized cellulose, perlite, diatomaceous silica (if desired), water carrying agent such as certain synthetic calcium silicates (if desired), and pigment (if desired) are mixed together to form a uniform mixture which is then distributed onto a belt, through a so-called "fluff box," which deposits the stock from an air suspension and levels it on the belt. The wet fiberized cellulose is preferably prepared by a novel process which involves dry spreading of the cellulosic fiber, preferably newsprint, and mixing of the dry shredded cellulose with water to form a mixture containing 30 to 60 percent by weight of solids, and fiberizing the cellulose in this mixture by wet fiberization of the mixture. Sufficient water is added for hydration of the cement in the subsequent curing, but the amount of water is insufficient to cause any of the ingredients to flow by gravity. Typically the stock in the fluff box contains about 10–15 percent by weight of moisture, based on the weight of dry solids, and an additional 15–25 percent of water, also based on dry solids, is added during sheet formation on the belt. Rework stock, trimmed at various points in the production line, in amounts up to about 40 percent of the total weight of solids may be used if desired. The raw material is preferably split between two fluff boxes, so that two layers of the base are formed on the belt. The second layer could be fed from a separate source and its composition could be varied somewhat, if desired. Surprisingly, these two layers adhere firmly together, certain measures being taken to insure that there is no plane of weakness between them as is characteristic in wet-process asbestos-cement. The two layers are compacted by means of a roll. One of the unique features of this invention is that exceedingly light roll pressures are used, compared to those generally used in prior dry processes. The compacting roll for the base material generally exerts a pressure of less than 100 pounds per lineal inch. The veneer is formed as the layer on top of the base sheet layers. The raw material furnish for the veneer, i.e., asbestos fiber, hydraulic cement, silica, whiting (calcium carbonate) and pigment (if desired) is premixed and deposited on top of the base sheet layer through a vibrating screen. A portion of the water required for hydration is added after deposition of the veneer. Surfacing granules may then be added, in the case of roofing shingles. This layer is then compacted at a light roll pressure less than 100 pounds per lineal inch. The characteristic wood grain texture is subsequently imparted by means of a so-called "grain roll," which further consolidates the stock. The texture pattern is preferably placed on a removable sleeve made of a suitable hard material, preferably metal or a hard resinous material such as epoxy resin. The pressure of the texture roll is considerably greater than the pressure of the compacting rolls, and is preferably on the order of 200 to 300 pounds per lineal inch, but to avoid over-consolidation and over-densification of the stock is much less than that applied by comparable roll or rolls in normal dry-process asbestos-cement shingle production. The textured sheet contains considerably more water than conventional uncured dry process sheets. Typical water contents of uncured sheet material in the present process are in the range of 25–40 percent by weight of water, based on dry solids, and amounts near the upper end of the range are preferred.

After texture has been imparted to the surface of the moist asbestos-cement material, the asbestos-cement sheets are stacked and allowed to cure in air. The shingles are then cut to length. Roofing shingles of this invention are advantageously treated with a bloom inhibitor which may include pigmentation; no such treatment is necessary for siding shingles if they are painted. The shingle is then steam cured at a pressure of about 40 to 150 pounds per square inch. A pressure of 100 to 110 pounds per square inch is preferred. This causes a reaction to take place between the hydraulic cement, perlite, and silica, forming a binder. The formation of this binder is essential to obtaining dimensional stability and the high strength in spite of low density which is characteristic of the shingles of this invention.

This invention will now be described further with reference to the accompanying drawings, in which:

FIG. 2 is a plan view of a strip roofing shingle according to the present invention.

FIG. 3 is a plan view of a siding shingle.

FIG. 4 is a detailed sectional view of a portion of a roofing shingle, taken along line 4—4 in FIG. 1.

FIG. 5 is an elevational view of a portion of the butt edge of a siding shingle according to this invention.

Figure 14B:
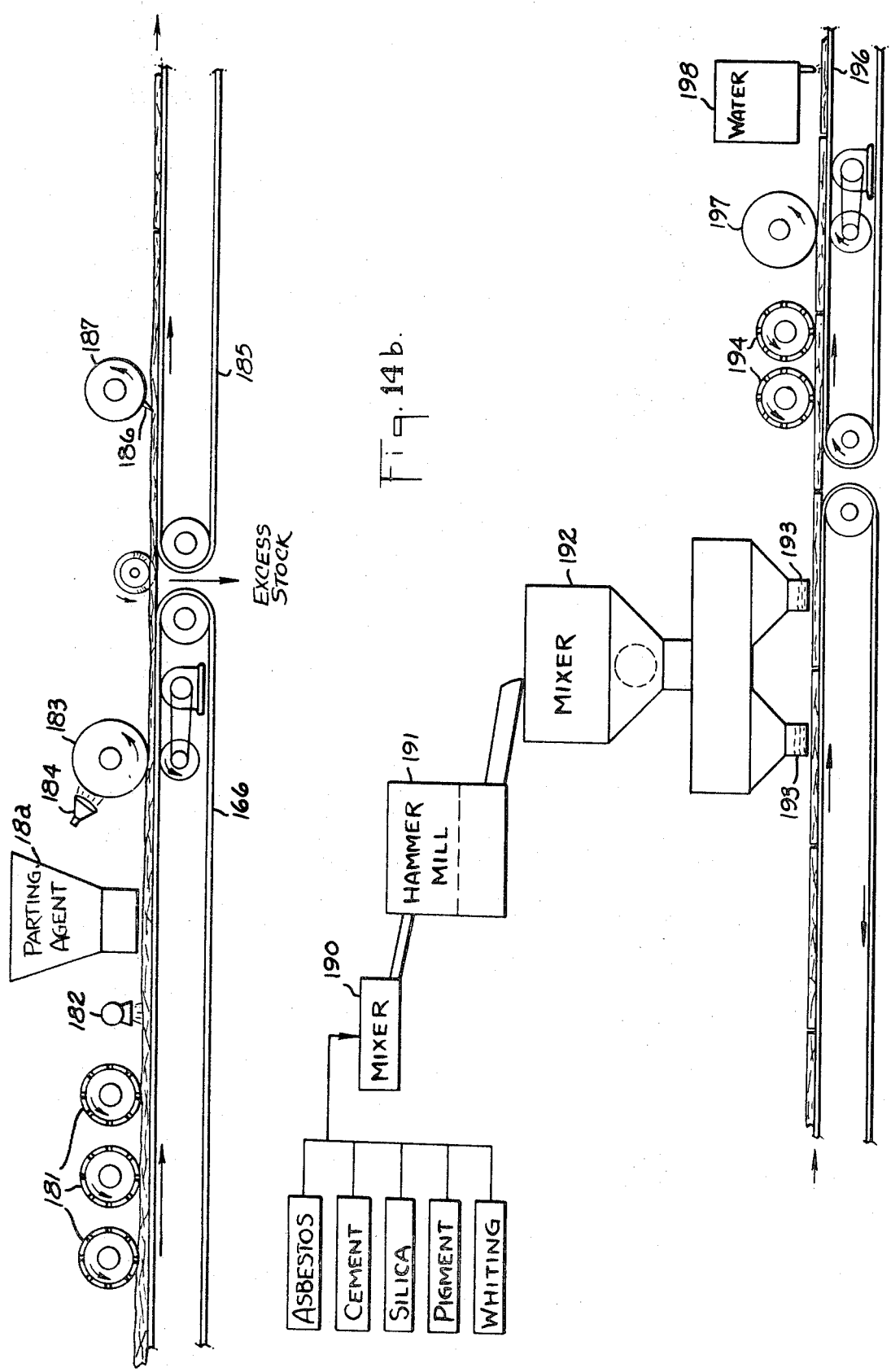

FIG. 14 (shown on three sheets designated as FIGS. 14A, 14B, and 14C respectively) is a flow diagram of a preferred process for making shingles of this invention.

FIG. 15 is a flow diagram of the steps of cutting and packaging a cured roofing shingle of this invention.

FIG. 16 is a flow diagram of the steps for processnig steam cured siding shingles of this invention.

FIG. 17 is a diagrammatic illustration of the process for preparing liners for grain rolls according to this invention.

Figure 1:
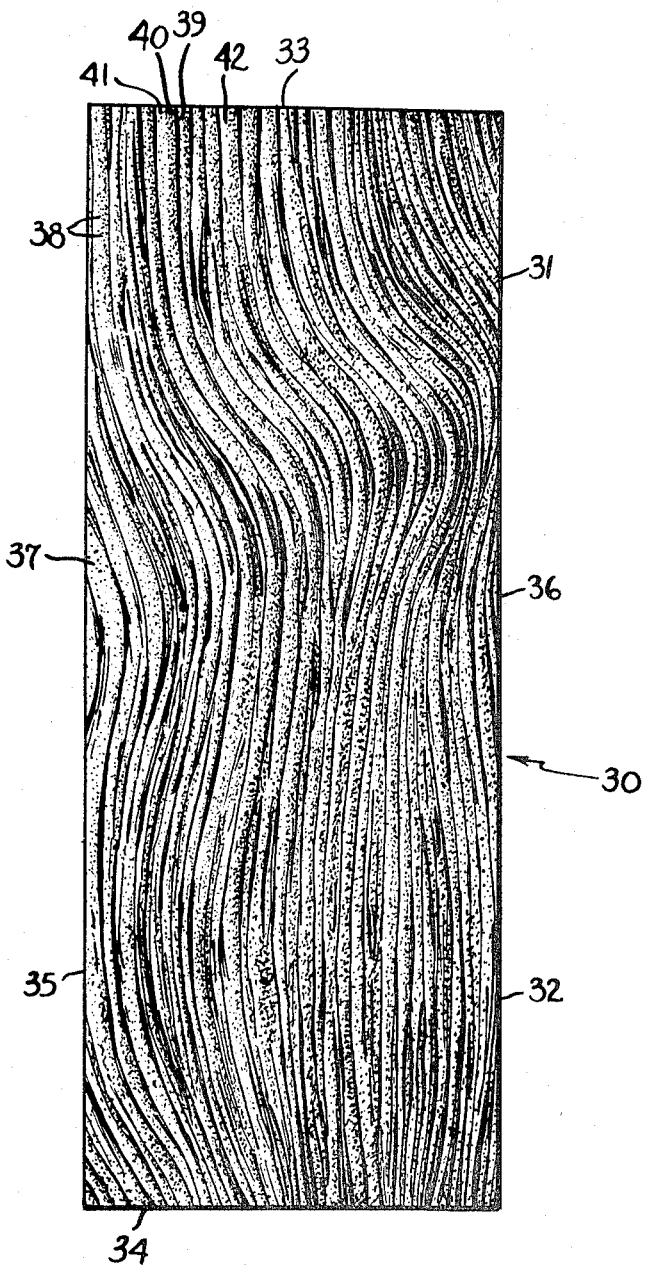
FIG. 1 is a plan view of a single unit roofing shingle according to the present invention.

Referring now to FIG. 1, 30 represents a roofing shingle according to one embodiment of this invention. The roofing shingle 30 of this imbodiment is a single unit shingle having a head portion 31 and a butt portion 32. This shingle is rectangular in shape, having a head edge 33, a butt edge 34, and left and right edges 35 and 36 respectively. The height of this shingle, i.e., the distance from the head edge 33 to the butt edge 34, exceeds the width.

Shingle 30 according to the preferred embodiment of this invention has an asbestos-cement base (which does not show in FIG. 1) of low density, and an asbestos-cement veneer of higher density. More will be said later about the compositions of the base and of the veneer. The front surface 37 of the shingle, which is the surface exposed to weather when the shingle is laid on a roof, is the outer surface of the veneer. This front surface 37 has a plurality of conventional roofing granules 38, preferably of 10 to 60 mesh size, which increase the weathering resistance and especially the erosion resistance of the shingle and serve as a processing aid which prevents or at least greatly minimizes the formation of cracks in the shingle during roll pressing in the dry process of manufacture. The shingle also has a back surface which does not show in FIG. 1.

The front surface 37 of shingle 30 has a plurality of alternating grooves 39 and ridges 40 which are arranged in a simulated wood grain pattern. The grooves 39 and ridges 40 run generally from the head edge 33 to the butt edge 34 of the shingle. The grooves 39 and ridges 40 give the general appearance of parallelism, but adjacent grooves 39 and adjacent ridges 40 are not precisely parallel throughout their length. Also, the grooves 39 and ridges 40 are not precisely parallel to the left and right edges 35 and 36 respectively of the shingle. As a matter of fact, the pleasing surface of the shingles of this invention is due in large measure to the close resemblance of the grain pattern to those occuring in natural cedar shakes and shingles, which resemblance necessitates a certain amount of irregularity in the grain pattern.

The front surface 37 of shingle 30 is deeply textured, which is important in order to obtain the desired aesthetic qualities in the surface. The depth of texture, which shall be defined herein as the depth of a groove 39, measured from the low point of the valley of the groove to the crest of the adjacent ridge 40 is not less than about 0.01 inch and may range up to about 0.10 inch. Each of the grooves 39 is formed in part by a pair of sloping side or flanks 41 and 42 which intersect at the valley of the groove. The first flank 41 in each pair slops downwardly to the right and the second flank 42 in each pair slops downwardly to the left. More will be said subsequently about sloping flanks 41 and 42, and their effect on light reflectance with reference to FIG. 4. Referring now to FIG. 2, a generally rectangular strip roofing shingle is shown in plain view. This strip shingle comprises a unitary head portion 51 and a butt portion 52 which is divided into three tabs 53, 54, and 55 by cutouts 56. These shingles are intended for laying in courses in the conventional fashion, and when so laid, the course above will cover the entire head portion 51 of each shingle, exposing only the three tabs 53, 54, and 55 of the butt portion 52. Shingle 50 has a head edge 57 which is straight and which extends the width of the shingle, and has a butt edge 58 which is divided into three segments 58a, 58b, and 58c by cutouts 56. The butt edges of these three segments may be aligned in a straight line as shown in FIG. 2. On the other hand, they may be offset so that the three tabs 53, 54, and 55 have butt portions of unequal head-to-butt edge dimensions. Each of the three tabs 53, 54, and 55 give the appearance of being a separate shingle. In addition to the two cutouts 56 separating adjacent tabs within the shingle, the shingle also has a cutout 59 of the same size along the left edge 60. The cutout 59 may be placed along the right edge 61 of the shingle instead, if desired; such placement has the advantage that the left edge 60 is in that case, which is the edge customarily used for aligning the first shingle in starting a new course, a continuous straight edge. Also, if desired, narrower cutouts having a combined width equal to the width of cutout 56 may be provided in edges 60 and 61. When the shingles are laid in courses so that the left edge 60 of one shingle touches the right edge 61 of the adjacent shingle, the slots at the actual joints between the two adjacent shingles are indistinguishable from the slots separating the tabs within one shingle. It should be noted that the actual joint line between the head portions of the adjacent shingles is concealed by the course of shingles above.

The strip shingle 50 of this invention is textured in the same manner as the single unit roofing shingle 30. That is, the front surface of the shingle has a plurality of alternating ridges 39 and grooves 40 which simulate a wood grain pattern. As in the case of a single unit roofing shingle, the grooves may be either symmetrical or asymmetrical, and in the case of asymmetrical grooves, either the right facing flank 41 or the left facing flank 42 may be the wider. Although there is no deliberate attempt to provide different sectors characterized by different slope angles in the corresponding flanks 41 and 42, there is greater probability for reasons to appear later in this description, that there will be such differences in a strip shingle than in a single unit shingle.

It will also be noted that the strip shingle has a width substantially exceeding its height and that the three tabs are of unequal width.

The texture in roofing shingles of this invention is rather bold, actually somewhat bolder than that normally encountered in natural wood shakes. The bold texture has been found to have greater visual appeal than a fine, close-grained texture which is more characteristic of natural wood shakes. However, it should be noted that some natural wood shakes have a bold texture on which the finer texture of the individual wood grains is superimposed, and the shingles of this invention give much the same visual effect as these bold-textured natural wood shakes.

The structure of the roofing shingles 30 and 50 of this invention is illustrated most clearly in FIG. 4. FIG. 4 is a partial, sectional view taken along lines 4—4 of FIG. 2 of roofing shingle 50. Both shingles 30 and 50 have the same structure.

Roofing shingle 50 has an exposed front surface 62 and a back surface 63. This shingle comprises a base 64 and a veneer 65. The outer surface of the veneer 65 is the front surface 62 of the shingle. The veneer 65 has a thickness in the range of about 0.01 to about 0.03 inch. The veneer 65 is a hard, dense material, probably asbestos-cement having a density of about 80 to 120 pounds per cubic foot which adds both strength and weather resistance to the shingle. The veneer 65 imparts sufficient strength and hardness to the shingle so that it does not dent or abrade during shipment. The veneer also has considerably more resistance to erosion than the base. Whereas the base would be subjected to erosion by rainfall, the veneer imparts long life, for it is highly resistant to such erosion. The veneer probably also decreases the rate of moisture absorption thereby increasing the dimensional stability of the shingle.

The strip roofing shingle 50 has grooves 39a and ridges 40a, connected by sloping flanks 41a and 42a. All of these parts are structurally the same as their counterparts 39, 40, 41, and 42, respectively, in the unit shingle 30 shown in FIG. 1. Flanks 41a slope downwardly to the right, and flanks 42a slope downwardly to the left. Ridges 40 and grooves 39 are rounded; flanks 41a and 42a have a substantially uniform slope except in the vicinity of the valleys of the grooves 39a and the crests of ridges 40a. The crests of ridges 40a generally lie predominantly approximately in a single plane, which may be considered the reference plane of the top surface of the shingle. Some of the ridges 40a may lie below this common plane, but it is preferred that none lie above it. Ridges lying above the common plane are subject to chipping and rapid wear, particularly during shipment.

The portion of shingles 50 shown in section of FIG. 4 is characterized by three sectors 66, 67, and 68 in which the flanks 41a and 42a forming grooves 39a have different widths and different slope angles. In the left hand sector 66, the flanks 41a are relatively narrow and steeply inclined with respect to the reference plane, while the flanks 42a are generally much broader and inclined at a much more gentle angle than flanks 41a. It will be noted that all of the flanks 41a in sector 66 have approximately the same slope angle, and that all of the flanks 42a in sector 66 have approximately the same slope angle. The middle sector 67 is characterized by flanks 41a and 42b of approximately equal width and approximately equal slope angles. These flanks are symmetrical and sometimes termed "vertical." The right hand sector 68 has grooves which appear to face in the opposite direction from the grooves in sector 66. In sector 68, the grooves 39a are formed by relatively broad and gently sloping flanks 41a, and relatively narrow and sharply inclined flanks 42a. Asymmetrical grooves give the appearance of facing in the same direction as the broader flank forming the groove; thus, the grooves in left hand sector 66 appear to face to the left to a viewer looking directly at the shingle, while the groove in the right hand portion 68 appear to face to the right.

The different sectors 66, 67, and 68 have different light reflectance characteristics because of the different slope angles of the flanks. Assuming that sunlight strikes the top surface 62 of shingle 50 from the left, the sectors 66 would appear the most brightly illuminated of the three sectors, since the broad flanks 42a in sector 66 are very nearly perpendicular to the incident sunlight. Middle sector 67 would appear somewhat less brightly illuminated, and right hand sector 68 would have the dimmest illumination, because the broad flanks 41a in that sector are nearly parallel to the incident light. The narrow flanks 42a in sector 68 would be much more brilliantly lit than the broad flanks 41a.

A strip siding shingle of this invention is shown in plan view in FIG. 3. The siding shingle, which is generally of essentially rectanguar shape, includes a head portion 71 and a butt portion 72. The shingle has a head edge 73, a butt edge 74, and left and right edges 75 and 76, respectively. The shingle is divided into three tabs 77, 78, and 79 of unequal width by rectangular channels 80. In addition to the two channels 80 which divide the shingle 70 into tabs, there is a third channel 81 running along the left edge 75 of the shingle. All three channels are of the same width and depth and all are parallel to the left and right edges 75 and 76, respectively, and as shown, and for convenience of manufacturing, all extend from the head edge 73 to butt edge 74. It is not essential in all cases, however, that channels 80 extend farther up from the butt edge 74 toward the head edge 78 than necessary to insure that they traverse the full height of the butt portion 72 which will be exposed to view, since this is the area of the shingle in which the simulation of separate shingle tabs will have its effect on the eye of the viewer of the shingles as installed.

The outer surface 82 of shingle 70 is textured with alternating grooves 83 and ridges 84 simulating a natural wood grain pattern. While the depth of texture is generally about the same in the siding shingles as in the roofing shingles, the grooves and ridges are generally narrower and more closely spaced in the siding shingles than in the roofing shingles. The bold texture effect which gives drama to the roofing shingles 30 and 50 is in large measure the result of the greater breadth of the grooves and ridges and their spacing. This texture may appear to some to be too bold for best aesthetic appeal in the siding shingles. Hence, the siding shingles of this invention have a grain pattern which is very nearly the same as the wood grain pattern in natural cedar shakes having a substantially level hand split surface. The grooves 83 have an average depth of about 0.03 to about 0.04 inch, and may range in depth from about 0.005 inch to about 0.1 inch. The grain runs generally from the head edge 73 to the butt edge 74. The grooves 83 and ridges 84 give the general appearance of parallelism, although they are not precisely parallel throughout their length, either to each other or to the left and right edges 75 and 76. As a matter of fact, it is preferred that the grain at least in the vicinity of channels 80, be at slight angles to the channels, and that these two angles be different in the two adjacent tabs, e.g., 77 and 78 or 78 and 79. This aids in giving the tabs 77, 78, and 79 the appearance of being the butt portions of separate shingles. This appearance is also preferably heightened by forming the butt edge 74 so as to comprise three non-aligned segments, 74a, 74b, and 74c, separated by the channels 80. Segment 74a constitutes the butt edge of tab 77; segment 74b constitutes the butt edge of tab 78; and segment 74c constitutes the butt edge of tab 79. The central segment 74b is substantially parallel to the head edge 73 of the shingle, and the segments 74a and 74c are formed respectively at slight and opposite angles to segment 74b so as to converge from the butt end corners 75a and 76a slightly upwardly and toward the center tab 78 and the joint-simulating channels 80 which flank the center tab. Corners 75a and 76a and segment 74b lie substantially in a line.

The siding shingles 70 include both symmetrical and asymmetrical grooves 83. As in the roofing shingles, the symmetrical grooves are those in which the two flanks 85 and 86 of each groove have essentially the same slope angle with respect to the reference plane of the top surface of the shingle, and have approximately the same width. Asymmetrical grooves are those in which the left flank 85 of a groove 83 is either substantially wider or substantially narrower than the right flank. Again, the narrower flank has the greater slope angle.

The strip siding shingles of this invention generally include both symmetrical grooves and asymmetrical "right facing" grooves and asymmetrical "left facing" grooves. These may be seen most clearly in FIG. 5. The "right facing" grooves are those in which the left-hand flank 85, which faces upwardly to the right, is wider than the flank 86. The "left facing" grooves are those in which flank 86, which faces upwardly to the left, is wider than flank 85. One possible arrangement of symmetrical and asymmetrical grooves comprises right facing grooves in left tab 77, symmetrical grooves in center tab 78, and left facing grooves in right hand tab 79. Not all singles should be manufactured according to this or any one pattern, because this has been found to produce a checkerboard effect when the shingles are laid on the side of a building. This is because all grooves which face in the same general direction have generally similar light reflectance characteristics. Thus, for example, all of the right hand tabs in the shingles on an entire wall might be more brightly illuminated that the left and center tabs when the sunlight strikes the wall at a certain angle and the observer is standing at a different angle. The regular occurence of brightly lit right hand tabs would produce the undesired checkerboard effect. This may be avoided by planned variation in the directions of inclination of the grooves. Thus, a majority of the shingles may have right hand tabs 79 with grooves facing to the left, which some shingles have grooves facing to the right in the right hand tabs.

The crests of a substantial number of ridges 84 lie substantially in a common plane. A number of the ridges, perhaps even a large majority, may lie below this common plane, but preferably none of the ridges should lie above this plane. Ridges lying above the common plane are subject to rapid erosion and wear. Ridges lying below this plane do not present such problems, and tend to heighten the aesthetic interest in the shingle.

The shingles of this invention are at least ¼" inch thick at the butt edge, and in the typical form as illustrated have substantially a uniform thickness throughout except for the local variations in thickness caused by the contours of the surface texture. Thickness is measured between the back of the shingle and the reference plane of the front face. Thickness of at least ¼ inch at the butt edge is necessary in order that each course of shingles will cast a deep shadow line on the shingles below. Conventional asbestos-cement shingles, which are considerably less than ¼ inch thick, cast only a narrow shadow line, which is partially responsible for the comparative lack of visual interest. Also, a thick shingle makes it possible to produce a deep texture. Only shallow texture can be produced on thin asbestos-cement shingles having substantially flat back surfaces, as is desirable. Deep textures are more appearling, particularly when viewed at a distance. Deep surface textures imparted to flat-back shingles by grooves in simulated wood grain textures are here distinguished from the contouring of shingles or sheets throughout their thickness as in regularly corrugated constructions in which the corrugation crest and valleys of one face lie opposite corresponding valleys and crests respectively of the opposite face, and in which the thickness of the sheet stock throughout is the same or substantially the same.

Shingles of this invention may have any desired maximum thickness, up to approximately 1½ inches, the maximum being limited primarily by the weight of the shingle. Generally it is not feasible to produce shingles thicker than about ¾ inch, because the asbestos-cement shingles of this invention are excessively heavy if thicker. A preferred thickness lies in the range of about 0.3 to about 0.5 inch; shingles having a thickness of about ⅜ inch constitute a preferred embodiment of this invention.

The shingles of this invention may be tapered from the butt end toward the head edge.

FIG. 5 is a view showing a portion of the cross-section of a typical siding shingle of this invention on an enlarged scale.

The siding shingles of this invention, like the roofing shingles, comprise a base and a veneer. In FIG. 5, shingle 70 has a base 101 and a veneer 102. The veneer 102 in the siding shingle 70 performs essentially the same functions as the veneer in the roofing shingle, plus the additional function of providing a paintable surface. The base 101 is too soft and absorbent for good paint life. The hard, dense surface of veneer 102 on the other hand has comparatively low absorptivity and paint has a long life on this surface.

It will be noted particularly in connection with FIGS. 4 and 5, that the texture configurations or contouring imparted to the various areas of the veneer in both the roofing and siding asbestos-cement shingles of this invention characteristically do not penetrate through the veneer but instead appear also as complementary in the corresponding and immediately contiguous underlying areas of the base. This provides for substantially an unbroken veneer layer, with good integration of the veneer and base, and adds to the strength of the overall shingle.

The base in both siding and roofing shingles of this invention is a hydrothermal reaction product of a mixture comprising about 3 to 20 percent by weight of asbestos fiber, about 25 to 45 percent by weight of hydraulic cement, about 10 to 25 percent by weight of silica, about 5 to 20 percent by weight of expanded perlite, and about 5 to 20 percent by weight of cellulosic fibers. In addition to these essential ingredients, the base may also contain fillers, e.g., up to about 10 percent by weight of diatomaceous earth, and up to about 5 percent by weight of synthetic calcium silicate. All percentages by weight are based on the total weight of dry solid raw material furnish. In addition to the dry raw material furnish, some rework asbestos-cement and small amounts of water may also be included in the stock from which shingles are formed. The rework asbestos-cement usually has approximately although not necessarily precisely the same composition as the raw material furnish.

The asbestos fiber serves as a reinforcing agent. Various grades of asbestos fiber such as 4 grade, 5 grade, and 6 grade may be used, although not all grades are used in equal amounts, nor do all grades give equally good results. The fiber grade or group designations set forth in this application are in accordance with the Quebec standard system. In general the asbestos fibers are of short to medium length. The amount of asbestos fiber is generally in the range of about 3 to about 20 percent by weight, based on dry solid raw material furnish. Amounts near the low end of the range, i.e., about 3 to 4 percent, are acceptable only when using the grades of fiber possessing the higher reinforcing values, such as 4-group fiber. A lower grade of fiber, such as 6-group fiber is also usable, but this grade does not give effective reinforcement in amounts much less than about 8 percent by weight. The amount of asbestos fiber may range up to about 20 percent by weight, based on dry solid raw material furnish.

Portland cement is the most common and preferred of the hydraulic cements which may be used in the shingles of this invention. In general, however, any type of hydraulic cement may be used, and other types of hydraulic cement, such as slag cement, may be substituted for portland cement if desired. The amount of hydraulic cement is in the range of about 25 to 45 percent of the total dry weight of solid raw material furnish.

Silica is an essential ingredient of the base in order to react with the hydraulic cement in curing and thereby form a strong cohesive product of good dimensional stability. The silica and perlite, which apparently acts in part as a source of some of the silica, react with the cement during steam curing of the shingle, which will be described in more detail later. Silica may be added in the form of finely divided quartz or sand. Precipitated silica may also be used, but it does not have any advantages over quartz or sand, which generally are cheaper. The amount of silica is about 10 to 25 percent of the total dry weight solid raw material base furnish. For optimum reaction with the hydraulic cement, the amount of silica should also be in the range of about 50 to about 80 percent of the weight of hydraulic cement in the furnish.

Cellulose is incorporated in the base furnish in order to impart nailability and sawability to the base. Without cellulose, the base would be so hard and brittle that it could not easily be sawed with an ordinary carpenter's saw, and would be prone to splitting or cracking if one attempted to drive a nail through the shingle. On the other hand, the incorporation of small amounts of cellulose generally in the range of about 5 to about 20 percent by weight based on the total dry solid weight of raw material base furnish, makes it possible to drive nails through the shingle without cracking or splitting it, and also makes it possible to saw the shingle with an ordinary carpenter's saw. This is a tremendous advantage for frequently some sawing is necessary at the construction site. Nailability is also an advantage, for nail holes may be omitted if desired, and the nailable shingles of the present invention grip a nail much more securely than the prior art asbestos-cement shingles which require nail holes. At the same time, surprisingly, the amounts of cellulose within the specified range have no adverse effect of consequence on the flammability of the shingle. Shingles of this invention, when laid on either building sidewalls or roofs in accordance with approved Fire Underwriters' techniques, have the Class A rating, which is the highest rating of the Underwriters Laboratory. The cellulosic content is important in improving the freeze-thraw resistance of the shingles, which is an especially important property in roofing shingles particularly when laid on a low-pitch roof, and also in siding shingles when laid close to the ground. The cellluosic fibers appear to add to the toughness and resilience of the shingles, reinforcing them against failures due to stresses caused by the forces of expansion and contraction which occur in freezing and thawing cycles.

A preferred form of cellulose is wet fiberized newsprint. The newsprint is first dry shredded, then mixed with approximately an equal weight of water, and then the moist newsprint is fiberized in a hammer mill or similar apparatus. Other cellulosic materials may be used provided they do not contain substances which interfere with the set of hydraulic cement. Many woods are to be avoided because they do contain various sugars, alcohols, aldehydes, and ketones, and other substances which are deleterious to the set of hydraulic cement. Fibers of cottonwood, aspen, and willow, and chemically treated fibers such as cold caustic treated wood fibers and kraft fibers may be used because they do not interfere with the set of the hydraulic cement. The incorporation of cellulosic fibers in the range of about 5 to 20 percent by weight based on the total weight of dry sold material furnish, provides the cured asbestos cement material with a toughness and workability which permits it to be nailed and sawed and otherwise handled in the same manner as wood, as well as increasing its freeze-thaw resistance. In addition, cellulosic fibers assist in lowering the density of the composition and in increasing the bending strength and tensile strength of the product.

In order to further reduce the density of the product, a lightweight bulking material is included in the composition, the preferred material being expanded perlite particles, having a density not over about 10 pounds per cubic foot. These contribute benefits in addition to bulking. It is presently preferred that the particles be of such size that most of them are between 50 and 100 mesh, which is an easy size to handle in the manufacturing process and is not so large that the particles are noticeably visible at the sheet's surface. At least about 5 percent by weight of the base composition should be comprised of expanded perlite particles in order to maintain the density of the base in the desired range and obtain the additional benefits which the perlite can provide. The maximum amount of expanded perlite is about 20 percent by weight of the base composition on the dry raw material solids base. This amount permits other essential ingredients to be present in sufficient amounts to contribute significantly to the effecting of the total combination of properties desired in the final product. In addition to lowering the density of the board, expanded perlite particles as previously indicated, are a source of part of the silica necessary for the steam curing operation. Being inorganic, the perlite particles are incombustible and contribute to the first resistance of the product. While expanded perlite is the preferred inorganic bulking agent, other low density materials and especially inorganic materials, can be used in its place. For example, verimculite or expanded clay could be used as substitutes since they are both low density or bulking materials and are inorganic. While it is not an absolute essential requirement, vermiculite and some expanded clays would combine with other ingredients to become a part of the final product. In the case of vermiculite, howevr, it does not bind quite as well with the other ingredients of the composition as does expanded perlite, and is not as preferable. Another material which could be used in place of expanded perlite is foamed cement, which would assist the hydraulic cement in binding the ingredients together and also would reduce the density of the final product.

Diatomaceous silica may also be added as a bulking agent in amounts up to about 10 percent by weight of the base stock composition. Diatomaceous silica, being low in density, acts as a bulking material to assist in maintaining the density of the final product within the desired range, and it contributes silica to be combined with the cement in the steam curing operation, thus reducing to an extent the amount of silica required from higher density silica sources. While it can be used for these beneficial properties, diatomaceous silica need not be used in the composition of the present invention by weight.

The presence of a highly absorbent filler material greatly facilitates the uniform introduction and distribution of a sufficient quantity of water into the sheet without unduly compacting and densifying the sheet, and also facilitates pumping and handling of the mixture. The preferred highly absorbent material is a low density finely divided hydrate synthetic calcium silicate, a Johns-Manville product commercially available under the trademark "Micro-Cel." When dispersed throughout the fibrous cement composition, the absorbent material quickly absorbs water added to the mixture both before and after the mixture both before and after the mixture has been deposited on the moving impermeable belt, making it possible to handle the mixture easily and to induce transport of water deposited on the surface of the material until the water is distributed uniformly through the material. This effective penetration and uniform distribution of the water is a factor contributing to the efficiency of the binder system and has to be achieved without the application of high pressures to the stock as normally required in the dry process. The use of high pressures on the stock is to be avoided so as not to compact the stock to an extent which tends to crush the expanded perlite particles and unduly densify the sheet or distort the texture pattern. In fact, very low roll pressures consisting of less than the weight of the press roll, are adequate to compact the material into sheet form. The amount of highly absorbent material is at least about 0.5 percent of the total dry raw material solids weight of the base formulation, and is preferably not over about 5 percent of the total. Amounts in excess of 5 percent are uneconomical and are unnecessary to absorb the amounts of water used in the dry process.

Other absorbent filler materials can be substituted for hydrated calcium silicate, but such substitution is not preferred. Diatomaceous silica, when present, supplements the calcium silicate as an absorbent. However, complete replacement of calcium silicate with diatomaceous silica is not preferred, since calcium silicate absorbs larger quantities of water per unit weight. The preferred synthetic calcium silicate can absorb water in amounts of 300 to 550 percent of its own weight before it becomes soggy and viscous, while diatomaceous silica can absorb only about 185 to 220 percent of its own weight of water before becoming soggy and viscous. This would require the use of diatomaceous silica in larger amounts than the amounts of hydrated calcium silicate used. The larger amounts of filler would limit the amounts of other essential ingredients of the composition.

The veneer in siding and roofing shingles of this invention has greater density, greater hardness, greater erosion resistance and less open surface than the base. The veneer possesses excellent resistance to erosion by rain. It also serves as a coating which protects the base from undue exposure to moisture. The veneer possesses sufficient shock resistance so that it is not dented, fractured, or cracked by ordinary objects striking the side or roof of a building covered with the shingles of this invention. The veneer also adds greatly to the strength and abrasion resistance of the material, minimizing damage in transit and in handling at the construction site. The veneer provides a surface which can be painted, which is highly important in siding shingles, and also has sufficient strength to permit a person to walk on the shingle, which is desirable in the case of roofing shingles.

The veneer in the siding and roofing shingles of this invention is a hydrothermal reaction product of a mixture comprising about 3 to 30 percent by weight of asbestos fiber, about 25 to 45 percent by weight of hydraulic cement and about 10 to 25 percent by weight of finely ground silica. Neither expanded perlite nor cellulosic fibers are present in the veneer formulation. These ingredients are absent, not only because of their coarseness, but more importantly, because the lower the density of the asbestos-cement product, and it is desirable for the veneer to have a high density in order that it may have maximum strength and resistance to moisture and abrasion. It is also unnecessary to include an absorbent filler material such as the hydrated calcium silicate or diatomaceous silica in the veneer formulation.

Asbestos fiber constitutes the reinforcing agent for the veneer just as it does for the base. The same grades of asbestos fiber may be used in the veneer as in the base; thus, grades 4, 5, 6, and 7 of asbestos fiber are all acceptable. However, it is preferred to use a somewhat shorter fiber in the veneer than in the base. Thus, while best results in the base are obtained with grade 4 fiber, it is generally preferred to use grade 6 or even grade 7 fiber in the veneer.

The hydraulic cement in the veneer may be identical to that used in the base. Portland cement is the most commonly used and preferred hydraulic cement, although other hydraulic cements such as slag cement may be used if desired. The hydraulic cement constitutes about 25 to about 45 percent by weight of the veneer furnish, based on the total dry solids weight of raw material furnish.

Silica is an essential ingredient of the veneer formulation, for reacting with portland cement during steam curing, thereby forming a strong cohesive product. It is also highly desirable to apply additional silica, preferably of somewhat coarser particle size to the top surface of the veneer to function as a processing aid in a manner later to be described and to help insure that the veneer will have good surface characteristics, especially freedom from objectionable cracking or checking.

The silica which is added for the purpose of reacting with cement is preferably finely divided silex, quartz, or sand. A typical particle size is in the range of 200–325 mesh. Silex and finely ground quartz are both acceptable forms of silica for reaction with cement. Precipitated silica may also be used, but it does not have an advantages over silex or quartz, and is generally more expensive. The amount of silica is about 10 to 25 percent of the total dry weight, based on raw material solids, of the veneer furnish, and for optimum reaction with hydraulic cement, the amount of silica is preferably in the range of about 50 percent to about 80 percent of the weight of the hydraulic cement in the furnish.

Fillers may be included in the veneer furnish and in some cases have a beneficial effect. Calcium carbonate whiting which is a preferred filler, helps insure that the veneer will not be too hard and brittle and thereby improves the nailability and sawability of the shingle. The preferred amounts of whiting are in the range of about 5 to 25 percent of the total dry solids weight of raw material veneer furnish. The whiting should be finely divided, not coarser than about 80 mesh, and whiting of 200 mesh and finer is preferred. Other fillers such as lime can be used, if desired. Generally the amount of filler should not exceed about 30 percent weight of the veneer furnish. While fillers may be used to help make the veneer less hard and brittle than it would be without any filler, this result also is at least partly insured by reason of the fact that the veneer stock generally is not, in the preferred dry process of this invention, consolidated under pressure to a density quite as high as that generally produced in the veneers of the typical thin, dense veneered asbestos-cement shingles made by the comparable conventional dry process.

Pigments may be included in the veneer furnish if desired. They are particularly advantageous in roofing shingles, which ordinarily are not painted. Ordinarily pigment constitutes no more than about 10 percent of the veneer furnish.

After a moist asbestos-cement sheet including the veneer layer, has been formed on the moving belt of the dry process line later to be described in detail, additional silica, preferably in the form of sand, is applied to the top surface of the veneer, in the case of siding shingles, for the primary purpose of preventing the formation of the fine cracks which are prone to form in asbestos-cement mixtures when the same are surface textured, especially by contact with a curved surface as on a press roll. The sand apparently acts as a parting agent in the process, to prevent the stock from sticking to the press roll. The roofing granules deposited on the top surface of the veneer of the roofing shingles in the production line, as later described, perform this parting agent function. Although the sand used for the parting agent function in the case of the siding shingles may be identical to the sand added earlier in the process for reaction with hydraulic cement, generally it is preferred to use a coarser sand to prevent checking and cracking of the surface. A somewhat more finely divided sand is added to the body of siding shingle veneer mixes than to the body of roofing shingle veneer mixes for prevention of checking and cracking. Typical particle sizes are about 60 to 80 mesh for siding shingle additions, and about 10 to 60 mesh for roofing shingle additions. The amount of sand added to the body of both roofing and siding veneer mixes to assist in the prevention of checking an cracking in processing is generally in the range of about 5 to about 10 percent by weight, based on the total dry solids weight of raw material veneer furnish.

In addition to the raw material solids in the base furnish of both the roofing and siding shingles, it is also desirable to include asbestos-cement rework or trim material in the base furnish. The amount of asbestos-cement rework material is generally in the range of about 10 to about 70 percent by weight, based on the dry solids content of virgin raw materials in the furnish. Stated another way, the rework material constitutes approximately 10 to 40 percent of the total weight of solids furnish, i.e., the combined weight of virgin raw and rework materials. The rework material may include air cured and steam cured asbestos-cement stock which is obtained as trim and broken shingles from the process line and, hence, is of substantially the same composition and usually contains substantial water. While the composition of the rework material may differ slightly from the composition of the raw material furnish, there usually and desirably are no marked or profound differences in composition. The use of rework material in the furnish is highly desirable because besides supplying some water to the sheet, when it is moist, it also helps promote the percolation of water to the interior and throughout the entire thickness of the sheet, and thus promotes the formation of a sheet having uniform moisture content. Also, the use of rework material is desirable from an economy standpoint, in order to minimize wastage of the asbestos-cement mixture which is trimmed or discarded for other reasons in processing.

Excess moist, uncured material from the production line is recycled and included in the base furnish. This material is obtained at various stages prior to air curing, as for example, from the fluff boxes, from trimming the sheet, and from broken sheets. This material has substantially the same composition as the raw material base furnish. The use of recycled, uncured stock is beneficial in causing the asbestos-cement sheet to be wet throughout its thickness.

The formation of a textured surface on the asbestos-cement shingles of this invention first requires the formation of a master sheet, as pointed out above and as will be described subsequently in greater detail. This master sheet contains all of the simulated wood grain patterns which are used in embossing the surfaces of shingles according to this invention. The master sheet is a "positive" having substantially the same configuration of grooves and ridges as the product's shingles but with somewhat greater depth of grooves. From this master sheet, a sleeve for the texture or grain roll of the dry process line is prepared. This sleeve is "negative" i.e., it contains the pattern of groove and ridge of the master sheet, but in the negative or mirror image sense.

Figure 6:
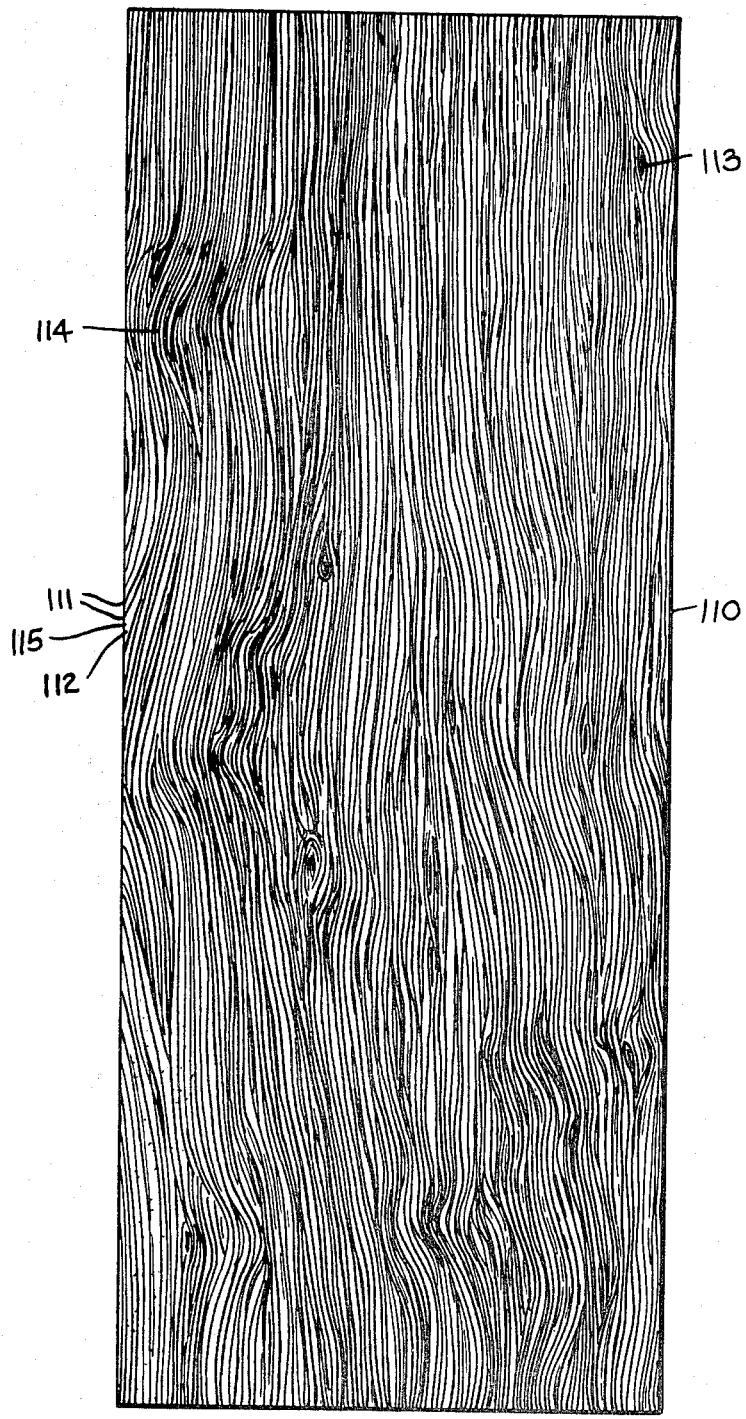
FIG. 6 is a plan view of a master sheet from which roofing shingles of this invention are prepared.

FIG. 6 shows the master sheet from which roofing shingles of this invention are prepared. The master sheet shown in FIG. 6 is made of epoxy resin or other material which will retain a desired pattern, once it is set, and from which a large number of grain roll sleeves can be obtained without appreciable erosion of the pattern. While an epoxy resin is a preferred material for the master sheet, it is understood that other materials and particularly hard metals and alloys such as steel and bronze may be used in making the master sheet if desired. The master sheet is somewhat wider than the shingles. Thus, for example, if it is desired to make shingles 24 inches wide, the master sheet will have a typical width of about 32 to about 40 inches. The master sheet is a number of times longer than the height of a shingle measured from its head edge to its butt edge. It is also highly desirable that the master sheet have a length which is not an integral multiple of the height of a shingle. This is important because a very large and virtually infinite number of different grain patterns are readily obtained on shingles on a production line without special indexing efforts, when the length of the master sheet is not an integral multiple of the height of a shingle, while only a comparatively few patterns would be obtained without special indexing efforts if the height of the master sheet were an integral multiple of the height of a shingle. The indexing mentioned, of course, has to do with the cutting and punching of the sheet of single stock material to form shingle blanks and finally finished shingles with little or no repetition as to the exact portion of the textured area of the master sheet which is reproduced within the bounding edges of the textured faces of the finished shingles.

The master sheet 110 includes a plurality of grooves 111 and ridges 112 in alternating sequence, running essentially lengthwise of the sheet. However, it is important in the highly preferred textures of this invention that the grooves and ridges simulate a natural wood grain pattern, and not be straight lines running directly from one end of the master sheet 110 to the other. The various configurations normally associated with natural wood grain patterns are formed on the master sheet. These patterns include varying distances between successive ridges, simulated knots 113, swirls or wavy portions 114 and any other desired configurations which are characteristic of a natural wood grain. The crests of a preponderate number of the ridges 112 lie generally or approximately in a plane corresponding to the reference plane of the top surface of the shingle. Some of the ridges 112 may lie below this common plane, but it is preferred that none lie above it. Such an arrangement has two advantages. First, ridges in the asbestos-cement shingle which lie above the reference plane of the top surface of the shingle are subject to considerable abrasion and wear during shipment, handling, and installation, and in the case of roofing shingles, under foot traffic on the roof. Secondly, substantial variation in the height of the ridges results in uneven roll pressure on the grain roll which forms the textured surface on the shingles and tends to produce local variations in density of the sheet. The grooves 111 on master sheet 110 are of considerably greater depth than the grooves in the product shingles, and, in fact, the texture defining surface configurations in general are more accentuated in the master sheet than in the final shingle product. There is a small amount of leveling action or loss of degree and sharpness of texture definition as the pattern of the master sheet 110 is transferred to the grain roll sleeve, and there is considerable leveling as the pattern on the grain roll sleeve is embossed onto the moist asbestos-cement sheets in the shingle-making line. The wet asbestos-cement mixture is abrasive, and this wears down the pattern on the grain roll sleeves. Hence, the grain roll sleeves must be replaced from time to time.

The alternating grooves 111 and ridges 112 on master sheet 110 are connected by flanks 115. These flanks may be divided into two sets, depending on the direction of slope. The first set of flanks slope downwardly and to the right, and the second set of flanks slope downwardly and to the left. The two sets of flanks 116 and 117 are arranged in generally irregular alternating sequence on master sheet 110. It has already been pointed out with reference to FIG. 1 that a shingle may have portions in which its grooves are symmetrical, and other portions in which the grooves are asymmetrical. The flanks 115 on master sheet 110 must have varying slope angles and widths in order to produce a variety of both symmetrical and asymmetrical grooves. The grooves in the greater part of master sheet 110 are asymmetrical. In some sectors, the flanks sloping in one direction (i.e., downwardly to the right) are comparatively broad with comparatively small slope angles, while the flanks sloping in the opposite direction (i.e., downwardly to the left) in that sector, are comparatively narrow with steep slope angles. In another sector of the master sheet 110, the flanks sloping in the first direction (i.e., downwardly to the right) are comparatively narrow, while the flanks sloping in the second direction (i.e., downwardly to the left) are comparatively broad. This gives a variety of light reflectance and shadow patterns on the shingles having textured surfaces embossed in accordance with the pattern on master sheet 110.

In FIG. 6, the upper end of the figure depicts the pattern impressed on the portion of the green asbestos-cement sheet which is the leading portion in the process line. The leading portion in the process line becomes the butt portion of the finished shingle. Hence, if one were to visualize individual shingles impressed in accordance with the pattern on master sheet 110, the butt edges of these shingles would be toward the upper end of FIG. 6.

Figure 7:
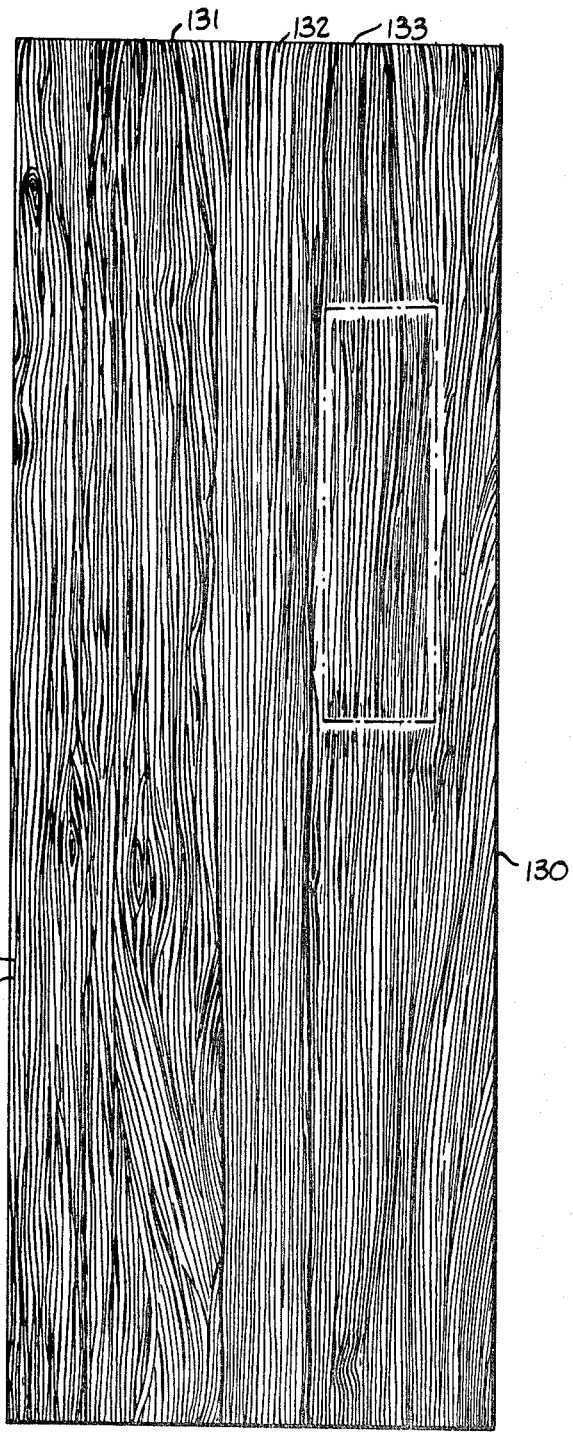
FIG. 7 is a plan view of a master sheet from which siding shingles of this invention are prepared.

Turning now to FIG. 7, this figure shows a master sheet 130 used for embossing patterns on siding shingles of this invention. The siding shingle master sheet 130 is also wider than the shingles textured therefrom, and also has a length which is a number of times the height of an individual shingle measured from its head edge to its butt edge. Again, it is desirable that the length of master sheet 130 not be an integral multiple of the height of an individual shingle, for as explained above in connection with master sheet 110, this readily gives a virtually infinite number of individual shingle patterns from a single master sheet.

The master sheet 130 shown in FIG. 7 is used for texturing of strip shingles having three tabs simulating three individual shingles. As has already been explained, the simulation of individual shingles is more effective if the grain patterns of each individual shingle intersect the joint line between the two simulated shingles. Accordingly, the master sheet 130 has three strips 131 132, and 133 corresponding to the left, center, and right tabs 77, 78, and 79 respectively of the strip shingle shown in FIG. 3. These tabs may be, for example, 6 inches, 8 inches, and 10 inches wide, respectively, giving a total shingle strip width of 24 inches. Of course, these dimensions are merely exemplary, but they are well suited to facilitating the laying up of the strip shingles in courses, by approved procedures such as described later in connection with FIG. 13.

As has already been explained in connection with FIG. 3, it is desirable that at least a portion of the grooves 83 of an individual shingle be asymmetrical, i.e., that the flanks 85 and 86 forming the individual grooves be of different slope angles and different widths. It was also explained that regularity in the asymmetrical nature of these grooves should be avoided. The master sheet 130 has grooves 134, ridges 135, and flanks which correspond in configuration to grooves 83, ridges 84, and flanks 85 and 86 respectively in shingle 70. In a typical master sheet 130, the grooves 134 in the center strip 132 are predominantly symmetrical. The grooves 134 in the left hand strip 131 of this master sheet 130 are typically, predominantly asymmetrical and inclined to the right; i.e., the flanks 137 sloping downwardly to the left are comparatively broad with small slope angles, and the flanks 136 sloping downwardly to the right are typically narrow and have sharp slope angles. In the right sector 133, the direction of asymmetry is typically just the reverse; i.e., the grooves 134 are predominantly asymmetrical and having inclined to the left, which means that their broad flanks 136 sloping downwardly to the right are comparatively broad with comparatively small slope angles, while the flanks 137 sloping downwardly to the left are comparatively narrow with comparatively sharp slope angles. The direction of inclination of a groove 134 is taken to be the direction of inclination to the left or right of vertical, of a bisector of the angle formed by two intersecting flanks which form a groove 134. However, if all shingles on a sidewall of a building have the same inclination of grooves, then the corresponding tabs of all of the shingles will have essentially the same light reflectance characteristics. For example, suppose that one were to cover the south wall of a house with shingles, all of which had symmetrical or "vertical" grooves in the center tab, grooves inclined to the right in the left tab, and grooves inclined to the left in the right tab. Next, suppose that the wall is being viewed in the afternoon, so that light strikes the wall from the southwest and at an elevation. The right hand tabs of each of the shingles would appear to be more brilliantly illuminated than the other two tabs, because the sunlight would strike the broad flanks in the right hand tab of each shingle nearly perpendicularly. This would give the side wall a checkerboard effect, particularly if the viewer sees the wall from a wide angle. To avoid this, the left hand strips and right hand strips 131 and 133 respectively of the master sheet 130 have areas in which the grooves are either symmetrical or in which the direction of inclination is opposite to the prevailing direction of inclination in that strip. One such area in the upper portion of strip 133 may be seen conspicuously. This area is shown in enlarged scale in FIG. 8.

Figure 8:
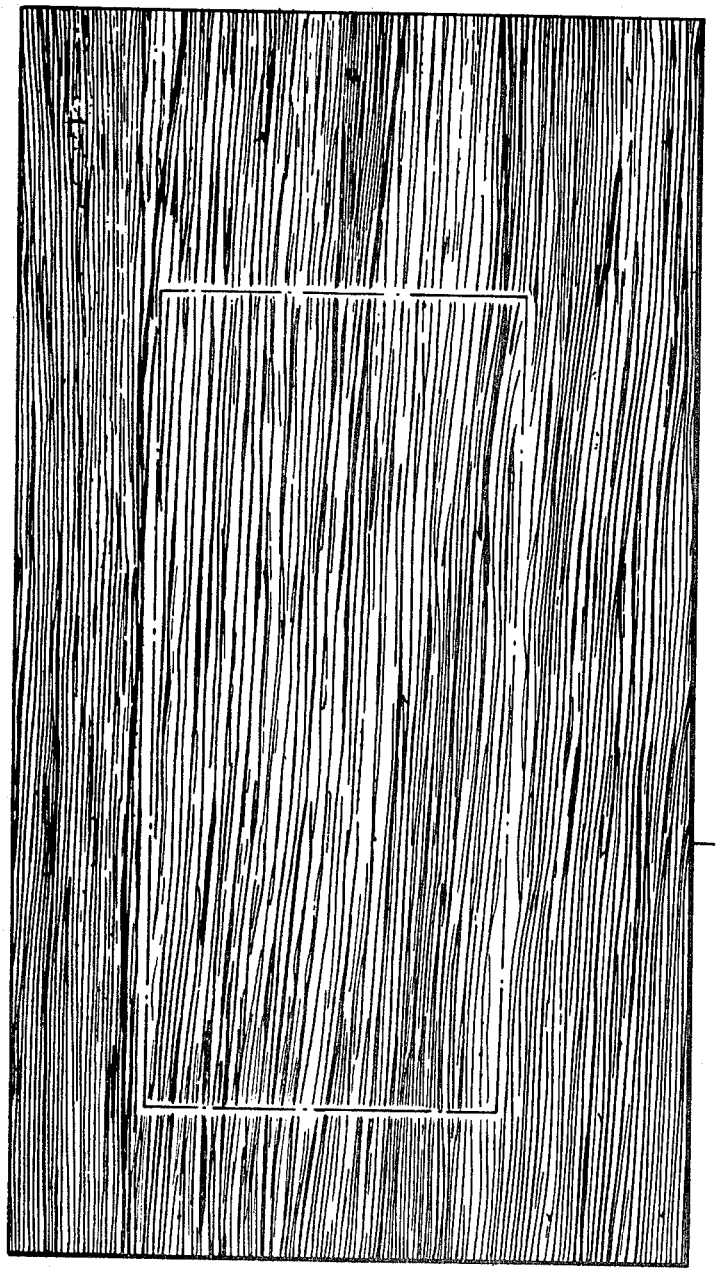
FIG. 8 is a detail of a portion of the master sheet shown in FIG. 7, illustrated on an enlarged scale.

Turning now to FIG. 8, strip 133 includes a central area 138 in which the narrow flanks 136 are inclined sharply down to the left, and the broad flanks are inclined gently down to the left. This is surrounded by an area 139 in which the inclination is just the reverse. Since the light is coming from the left, the central area 138 has the appearance of being more brightly illuminated than the surrounding area 139, because the broad flanks sloping downwardly to the left are nearly perpendicular to the light source and are, therefore, brilliantly illuminated. At the same time, the flanks sloping downwardly to the right are deeply shadowed. The provision of planned irregularlities in the direction of inclination of grooves 134 in the master sheet 130 and consequently in shingles printed in accordance with the pattern thereon, avoids checkerboarding, since the most brilliantly illuminated parts of the shingles on a slide wall will not be the correspondingly located parts on all shingles. When roofing and siding shingles of the present invention are laid in horizontal courses, both the unit and the strip shingles give the appearance of a plurality of unit shingles.

Figure 9:
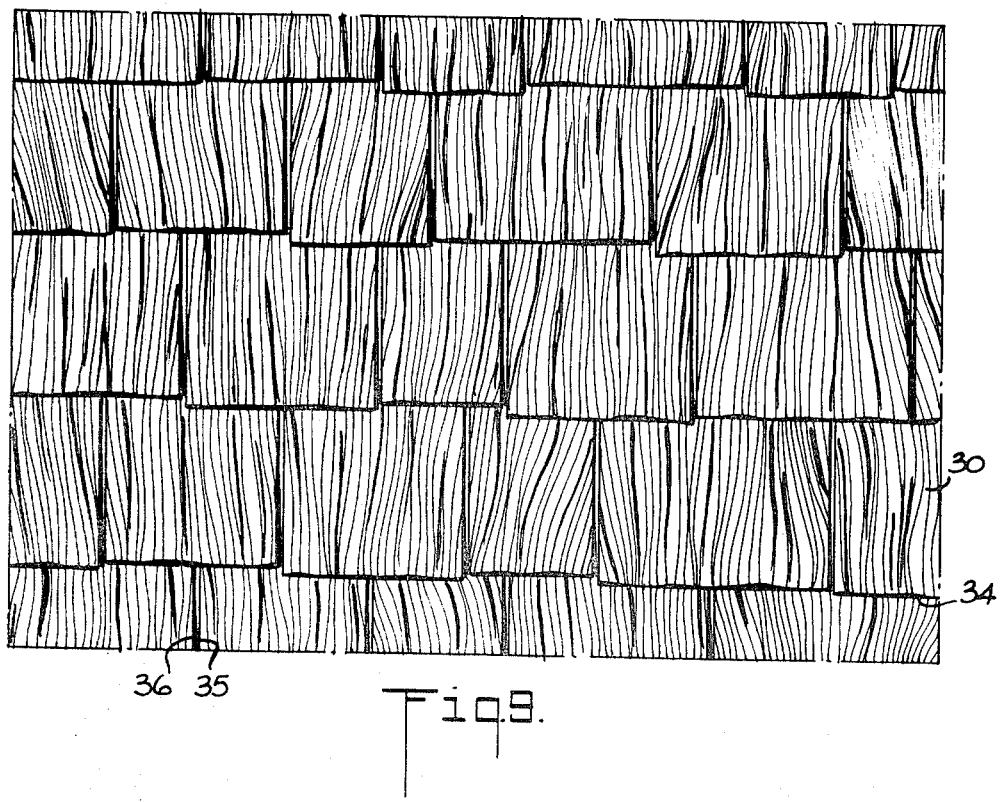
FIG. 9 is a front elevational view illustrating the appearance of a portion of a roof covered with unit shingles of this invention.

Referring now to FIG. 9, a plurality of unit roofing shingles 30 are laid in horizontal courses with the left edge 35 of each shingle spaced apart by a small distance from the right edge 36 of the adjacent shingle, and with the butt edges 34 slightly offset so as to give a rustic effect. Whether the butt edges 34 of the shingle in a course are slightly offset as shown, or in a straight line, is a matter of preference, and shingles can be laid either way according to this invention.

Figure 10:
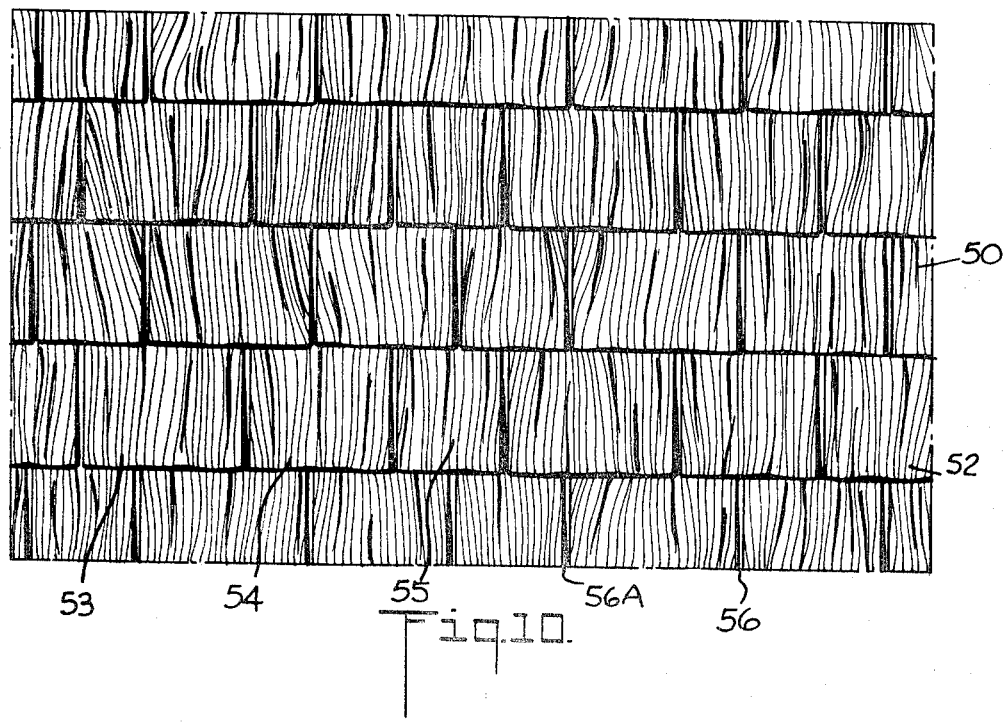
FIG. 10 is a front elevational view illustrating the appearance of a portion of a roof covered with strip shingles of this invention.

FIG. 10 illustrates a portion of a roof covered with the strip roofing shingles 50 of this invention. As illustrated in FIG. 2, each strip shingle 50 has a head portion, covered by the course of shingles above, and an exposed butt portion 52 comprising a plurality of tabs 53, 54, and 55. In the illustrated embodiment, the left tab 53 is the widest, the center tab 54 is narrower, and the right tab 55 is the narrowest. As may be seen in FIG. 10, the cutouts 56 separating adjacent tabs of the same shingle are indistinguishable from the cutouts 56A which separate adjacent shingles. Thus, it is possible according to the present invention to make shingles in strips containing into account tabs, and of various desired lengths, taking into account facility of handling and manufacturing.

Figure 11:
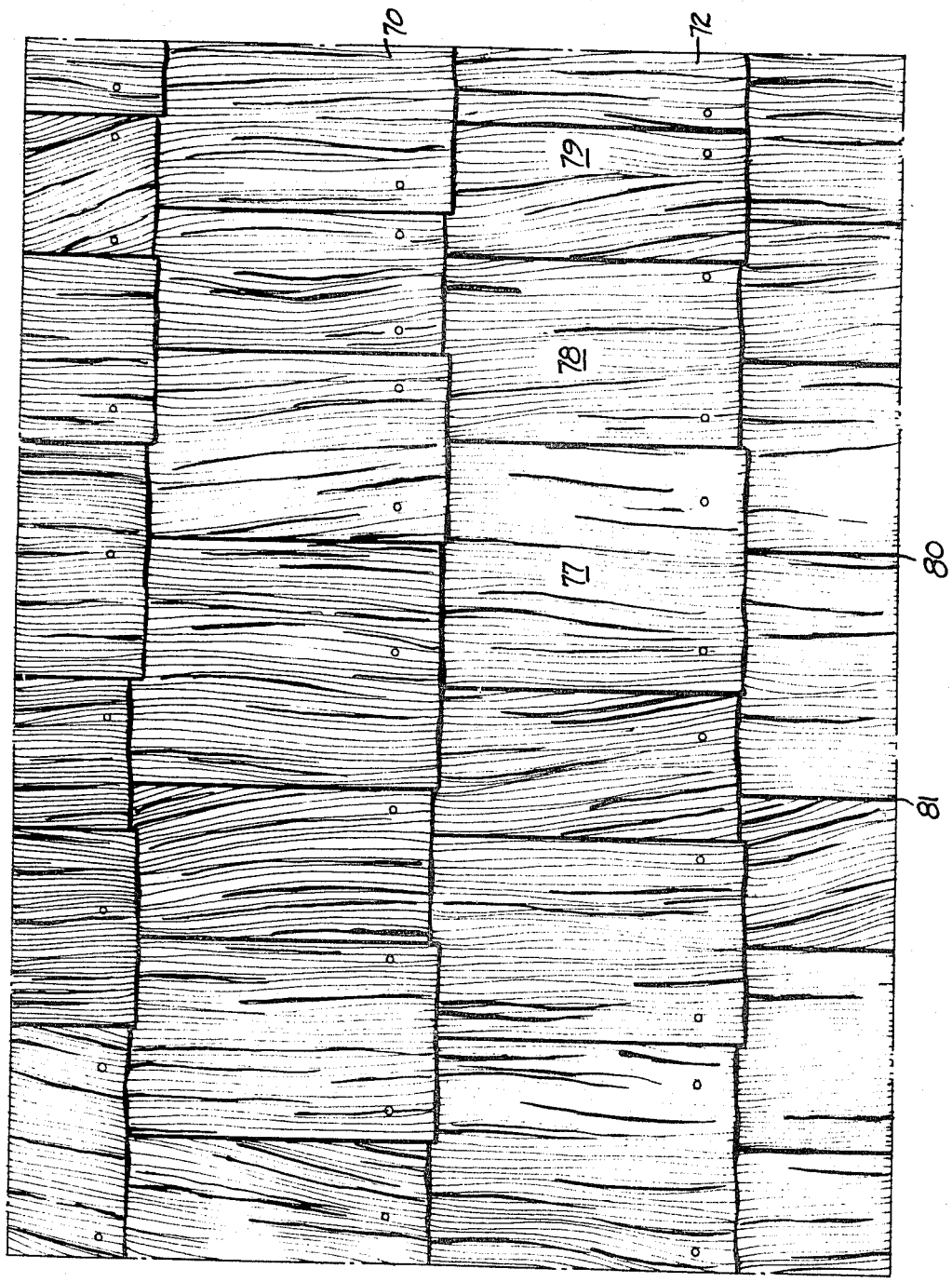
FIG. 11 is a front elevational view illustrating the appearance of a portion of a building sidewall covered with strip siding shingles of this invention.

Referring now to FIG. 11, a side wall covered with siding shingle 70 of this invention is illustrated. Each of these siding shingles 70, illustrated in detail in FIG. 3, has three tabs 77, 8, and 79 of progressively decreasing width. As previously pointed out, the adjacent tabs within a shingle are separated by a rectangular channel 80, and channels 81 running along the left edges of each shingle mark the joints between adjacent shingles. When the siding shingles of this invention are properly laid so that each shingle forms a butt joint with the adjacent shingles in the same course, the channels 80 separating adjacent tabs within a shingle appear the same, except on close inspection, as the channels 81 at the edges of the shingles, so that each tab appears to be a separate shingle. In accordance with conventional shingle laying practices, the head portions of each shingle are covered by the course above, and only the butt portions 72 are exposed.

Figure 12:
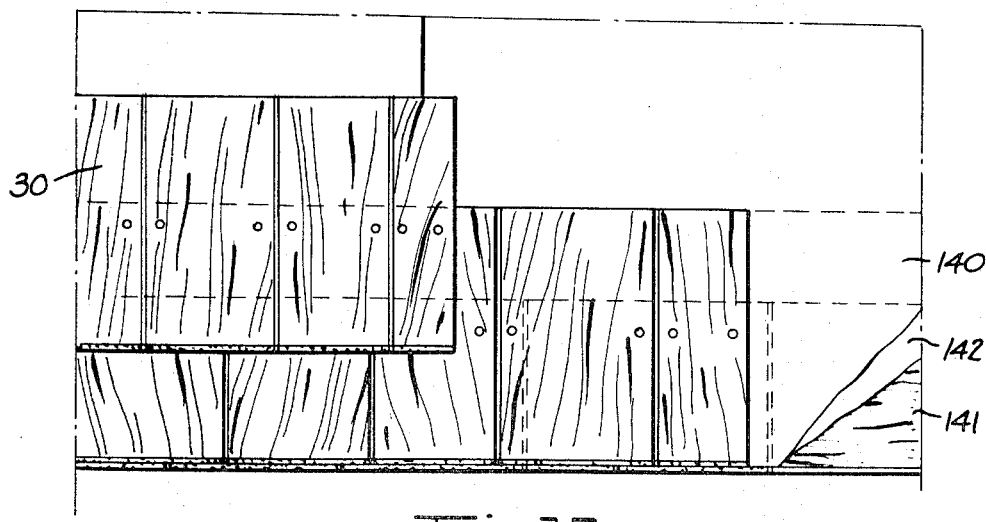
FIG. 12 is a pictorial view of a portion of a roof, with portions cut away, illustrating the application of roofing shingles of this invention.

FIG. 12 illustrates a portion of a typical roof covered with shingles of this invention. The underlayment 140 of the roof is conventional and includes, in the embodiment shown, wooden sheathing 141, waterproof paper 142 (which preferably is conventional bituminous saturated asbestos felt or the like where a Class A fire rating is desired) and a plurality of courses of shingles 30 laid so that the head portion 31 is covered by the course above, leaving the butt portions 32 exposed.

Figure 13:
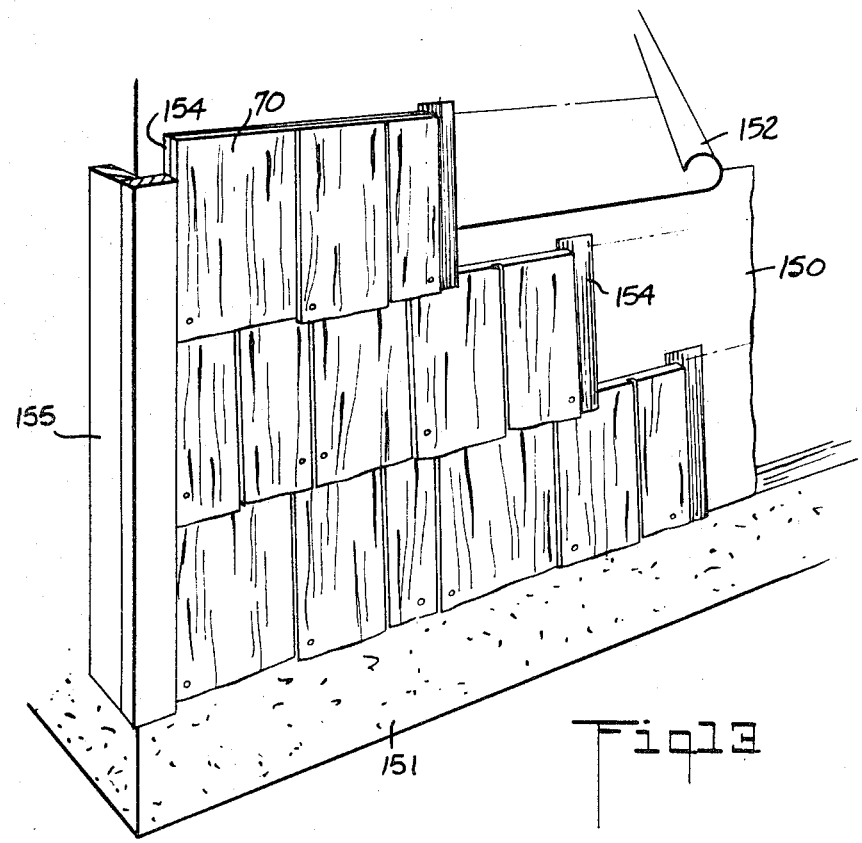
FIG. 13 is a pictorial view of a portion of a building sidewall, with portions cut away, showing the covering of a wall with siding shingles of this invention.

FIG. 13 shows a portion of a typical side wall covered with siding shingles 70 of this invention. The side wall underlayment 150 is conventional. In the embodiment shown, the underlayment 150 and the shingle 70 thereon are disposed above a riser 151 of concrete or the like located just above the ground. The underlayment 150 includes a plurality of horizontally extending strips of waterproof paper 152, which may be asphalt paper on the sheathing 153. Vertical waterproof backer strips 154 preferably provided behind the true buff joints between adjacent shingle side edges, to help close these joints against the weather, and corner joint timbers 155 typically constitute the corners of the side wall.

Shingles of this invention are preferably made by the dry process. The dry process gives shingles having a freeze-thaw stability generally superior to that of low density wet process shingles. Even though in the dry process, as later described, the furnish is deposited on the sheet forming belt in a plurality of layers, generally two layers of base furnish followed by the veneer layer, nevertheless the final product is essentially a nonlaminar product which is devoid of planes of weakness. The fibers are more or less randomly oriented throughout the sheet, providing effective reinforcing action. Wet process shingles, on the other hand, are characterized by a plurality of laminae, each separated by a plane through which virtually no reinforcing fibers pass. These are planes of weakness, and when a wet process shingle is subjected to freezing and thawing, rupture is prone to occur at these planes.

FIG. 14 illustrates a preferred dry process for making shingles of this invention. Except for minor variations as will be noted, the processes for making siding and roofing shingles are the same.

Referring now to FIG. 14, all of the ingredients of the base furnish except perlite are mixed in mixer 160. The ingredients added in mixer 160 include asbestos fibers, hydraulic cement, silica, reprocessed or reworked asbestos-cement stock, calcium silicate, and wet-ground newsprint or other cellulosic material. The newsprint is first dry-shredded, mixed with water, and then wet-fiberized in a hammer mill. This aids in distributing water throughout the mixture.

It is essential that the cellulose be fiberized prior to admixture with the other ingredients of the base furnish. The cellulose cannot simply be dry ground to the desired particle size, because dry ground cellulose particles tend to clump together rather than to be mixed uniformly with the inorganic ingredients of the dry mix, and because fine dry ground cellulose, particularly newsprint, is not wet rapidly enough on the conveyor belt to permit making of a coherent sheet which is wet throughout its entire depth. Cellulose fiber which is prepared by beating the cellulose with a large excess of water followed by removal of the excess water, is also unsatisfactory because it too is of little or no assistance in causing process water to penetrate into the interior of the asbestos-cement sheet. Applicants have found that it is essential to first shred the cellulosic material, such as newsprint, in the dry state, and then to mix it with the amount of water which is actually desired in the mixture of cellulose and water which is admixed. This amount is about 30 to 60 percent, and preferably 50 percent by weight of solids (i.e., cellulose) content. A third essential step is to beat the cellulose until defiberization occurs. This may be accomplished in a hammer mill. An apparatus found well suited to this purpose is a Rietz Model RD 18 grinder, having an 18 inch diameter screen with ¾ inch diameter openings, and driven by a motor of not less than 100 horsepower. Of course, it will be understood that the power rating of the motor may be varied in accordance with the desired throughput of the grinder. Defiberization requires at least about 55,000 foot pound of mechanical work per pounds of cellulose. The fiberized cellulose may then be admixed with the inorganic ingredients (except perlite where used) of the base furnish. The mixture of ingredients from mixer 160 is conveyed to a fiberizer 161, e.g., a hammer mill, and the fiberized mixture is then transported to a mixing tank 162. Perlite and any recycled asbestos-cement mixture obtained from the process line are introduced into mixing tank 162. Perlite may be omitted if desired, provided the cellulose content is sufficiently high to give the desired low density, or else provided that another bulking agent, such as vermiculite, is used instead, but perlite does appear to provide special advantages, as pointed out above, and hence it is presently preferred to use perlite. The mixing tank 162 produces an intimate mixture of ingredients which is laid down on the continuously moving forming conveyor as the stock or furnish to which additional water is added to form the base of the asbestos-cement sheet. This stock is split into two portions in a stock divider 163. In a typical operation, the stock is split into a primary portion of two parts by weight and a secondary portion of one part by weight. It will be understood that the ratio of primary to secondary portions of the stock may be varied, although the amount of the primary portion is generally equal to or greater than the amount of the secondary portion.

A conveyor transports the primary portion of the stock from the stock divider 163 to the primary fluff box 164, which contains a number of pairs of spiked rollers 165 rotating in opposite directions to cause the material to be forced downwardly toward the continuously moving conveyor 166. The rollers 165 disperse the ingredients of the composition in air suspension to uniformly deposit a layer 167 of the stock on the conveyor 166. Conveyor 166 is an impermeable endless belt of rubberized fabric or the like. Slightly upstream from the fluff box 164 is a water box 168, constructed so that water continuously overflows a gate at a predetermined rate. Since the details of such structures are known in the art, they have not been illustrated. Water is conventionally applied to the endless belt 166 at this point in order to insure wetting of the lower surface and the adjacent portion of the primary layer of stock 167 on the belt 166.

The layer 167 is subjected to the action of a picker roll 169 which has a number of spikes or pins protruding generally radially from its periphery. The picker roll acts to level the layer 167 and to throw any excess material back into a screw conveyor 170 for reuse. Picker roll 169 rotates in a direction opposite to the stock feed direction; i.e., it rotates clockwise as seen in FIG. 14.

In the conventional dry process, the layer of material emerging from the fluff box is subjected to the action of a perforated roll for removing excess air from the interior of the layer. The base furnish in the present process, however, has an extremely fluffy nature and contains much more excess air than the usual asbestos-cement compositions, because of the presence of substantial amounts of cellulosic fiber. Best results in removing excess air are obtained by using two or more perforated rolls 171 mounted in tandem and in such manner that their full weight does not rest upon the layer 167 of material. By applying only a small amount of pressure, on the order of about 50 pounds per lineal inch, excess consolidation of the material is prevented. The perforations in the rolls 171 impart a slightly dimpled or worked effect to the top surface of the primary base stock layer on the conveyor 166. This is believed to assist in the knitting together of the primary base stock with the subsequently applied secondary base stock layer.

Following the action of the perforated rolls 171, water is applied to the layer 167 by a water spray 172 and a pair of water boxes 173 and 174 arranged in tandem. The total amount of water applied by water spray 172 and water boxes 173 and 174 is considerably greater than the amounts applied by the initial water box 168. Water box 173 supplies the greater amount of the combined water applied to the top of layer 167 from water spray 172 and water boxes 173 and 174. It will be understood that the water applied at this point may be applied entirely by means of one or more water boxes, or by a water spray instead of a combination of water spray and boxes if desired.

Because of the difficulty of dispersing water throughout the thickness of the asbestos-cement base stock, this base stock is split into two portions as previously stated and only the primary portion is applied through fluff box 164. The remainder of the base stock is applied through a secondary fluff box 176. The secondary portion of the base stock, which typically constitutes about one-third of the total, is conveyed from stock divider 163 to the secondary fluff box 176. Secondary fluff box 176 may be structurally identical to the primary fluff box 164, and contains a number of spiked rolls 177 which disperse the secondary base stock in the form of a fluffy layer 178 on top of the compacted layer 167 of primary stock, a picker roll 179 which levels the layer 178, and a conveyor 180 for removing the excess stock thrown off by picker roll 179 in the levelling process. The excess stock removed by both conveyors 180 and 170 is returned to the mixing tank 162. The fluffy secondary stock layer 178 is then compacted by a plurality of perforated rolls 181. These rolls perform the same function as the previously mentioned perforated rolls 171, but are preferably mounted slightly higher, due to the increased thickness of the asbestos-cement layer. Light roll pressures, on the order of 50 pounds per lineal inch or less, are used on rolls 181 to prevent undue compaction of the asbestos-cement. A small amount of water is then added through water spray 182.

All process water added at any point along conveyor belt 166 is preferably heated. Preferred temperatures are in a range of about 120 to about 200 degrees F., temperatures of about 160 to 170 degrees F. being the most desirable. Heated water penetrates into the interior of the asbestos-cement material at a satisfactory rate when the base furnish composition previously described is adhered to. Water at room temperature, on the other hand, penetrates into the asbestos-cement stock too slowly to be acceptable for continuous dry process production.

A particulate parting agent such as marble dust of about 60 to 80 mesh screen size is added through hopper 181a to the surface of the asbestos-cement layer 178 in order to prevent sticking to the press roll 183. The amount of parting agent may be varied, but it is seldom in excess of 0.1 pound per hundred square feet of surface area of the asbestos-cement material.

After addition of the parting agent, the asbestos-cement material on belt 166 is further compacted by press rolls 183. Press rolls 183 include a motor driven roll below belt 166 and an idler roll above the conveyor belt. The upper roll is preferably heated by means of an infrared lamp or other suitable heat lamp 184. A distinctive feature of the modified dry process of the present invention, and one which is essential to obtaining shingles of the desired quality, is that the roll pressure on press roll 183 is considerably lower than that previously employed in dry process operations. The pressure on press roll 183 is typically in the range of about 60 to about 100 pounds per lineal inch, seldom higher, a preferred operating pressure being about 85 pounds per lineal inch. Roll pressures substantially above 100 pounds per lineal inch are avoided since such pressures are prone to cause blow-back of dry air which is entrapped in the center of the asbestos-cement layer. When the asbestos-cement layer reaches press rolls 183, the top portion and the bottom portion are both wet, but there is a dry zone that has some air in the center. Until moisture penetrates through the entire sheet, high roll pressures are avoided.

Because of the length of the processing line, it is convenient to divide the line into segments, each having its own endless belt. For convenience, the upper reach of conveyor belt 166 ends a short distance beyond press rolls 183, and the green asbestos-cement sheet passes onto a second conveyor 185 where the edges, which may not be as well formed as the center of the sheet, are trimmed off by driven rotary slitters for recycling to mixer 162.

The asbestos-cement sheet is cut into lengths after the edge slitting operation. This is accomplished by means of a rotating cutter blade 186 which is mounted on a hollow roll 187. In a typical operation, the green asbestos-cement sheet is cut into lengths of approximately 101 inches each. Subsequent processing causes these lengths to shrink to about 105 to 107 inches.

A veneer is applied to the uncured asbestos-cement sheet after it has been cut into lengths. The veneer, which as previously explained is denser than the base after curing, is necessary in order to impart weatherability, erosion resistance, and strength sufficient for serviceability as siding and roofing without unduly increasing the overall density of the shingle.

The ingredients of the veneer stock, i.e., asbestos fiber, hydraulic cement, silica, whiting and pigment where desired, are mixed in a mixer 190, ground in a suitable mill such as hammer mill 191, and are again mixed in mixer 192 and passed through a screen 193 which preferably has a pair of screened openings which are spaced apart in the direction of travel of belt 185. It is preferred to deliver the veneer stock in finely divided particulate but fairly compact form, rather than to use a fluff box as is done with base stock. Even with the use of the veneer delivery apparatus shown, some air is entrained with the powdery veneer stock, so that the stock is next subjected to the action of perforated rolls 194, which lightly compact the veneer layer 195 and drive out a portion of the air entrapped therein. For convenience the perforated rolls 194 may be located near the beginning of a third conveyor belt 196. After deaeration and consolidation by perforated rolls 194, the green asbestos-cement mixture is subjected to the action of motor driven press rolls 197, where a typical roll pressure is about 80 pounds per lineal inch. The pressure on these rolls may vary, however, from about 50 to about 100 pounds per lineal inch. One of them is motor driven. Water is then added to the veneer layer through water box 198.

Granules are applied to the surface of roofing shingles of this invention through granule applicator 200. The granules are preferably of an inert material which will not undergo reaction in the subsequent curing operations, and which will impart both abrasion and weathering resistance and a decorative appearance to the surface of the roofing shingle. Crushed stone is a preferred material for this purpose, and the preferred size range is from about 10 to about 60 mesh. It may be desirable, for decorative effect, to use two or more granule applicator hoppers 200 containing different colors of crushed stone. For example, in a preferred embodiment, three hoppers, respectively containing brown, black, and gray crushed stone, are used. The crushed stone granules applied to roofing shingles are not applied to the surface of siding shingles manufactured by this process. Instead, a more finely divided particulate material is preferred for siding shingles, because the siding shingle surface should be smooth so as to accept paint readily, while the slightly roughened surface imparted to the roofing shingles by crushed stone is not only esthetically pleasing but is also valuable in reducing erosion. The preferred parting agent for siding shingles is 60–80 mesh sand. Both the granules applied to the roofing shingles and the sand applied to the siding shingles serve as a parting agent. The function of the parting agent is to prevent sticking, checking and cracking of the surface of the sheet during the subsequent texturing operations.

After the formation of the veneer layer and the addition of crushed stone or sand where applicable, the desired texture pattern is imparted to the top surface of the green asbestos-cement sheet, which is the top surface of the veneer layer. It is at this point that the previously described wood grain pattern is imparted to the surface of the sheet which subsequently becomes the front or top of weather surface in the finished shingle. The texture rolls 201 include a hollow upper grain roll 202 and a lower motor driven backup roll 203. Both rolls 202 and 203 may be motor driven if desired. These rolls are located between the third conveyor belt reach 185 and the fourth conveyor belt reach 204.

The upper texture roll 202 is a smooth metallic (e.g., steel) roll having a thin sleeve which contains the desired wood grain texture on its outer surface. This texture roll and sleeve will be described subsequently in more detail with reference to FIG. 17. The circumference of the texture roll 202 may be about the same as the length of a single sheet of the asbestos-cement material, i.e., about 107 inches. This length, it might be noted, is not a multiple of the shingle height, which typically is about 13½ inches in the case of siding shingles and about 16 inches in the case of roofing shingles. It will be understood, of course, that any desired dimensions of shingles may be chosen, and that these dimensions are merely exemplary. Regardless of the exact dimensions chosen, it is desirable that the length of an individual sheet not be an exact multiple of the depth of an individual shingle. Also, the circumference of the texture sleeve on upper roll 202 should not be exactly the same as the length of a cut section of green asbestos-cement stock. In this way repetitive patterns are readily avoided.

The edges of the textured green asbestos-cement sheet are consolidated by means of an edge consolidator 205 which is mounted above the fourth conveyor belt 204. The edge consolidator simply consists of a pair of thin vertical strips which direct the edges of the green sheet inwardly by a small amount, so as to give a firm edge with little material subsequently flaking off at the edges. Loose particles and fines are then removed from the top surface of the green asbestos-cement sheet by means of vacuum cleaner 206. Any reject sheets or pieces of stock which were accidentally broken in processing, are then recycled to mixer 162. The sheets are then stacked in the moist condition, with a water content of about 25–40 percent based on the weight of the total dry solids. It is to be noted that this is a much higher percentage of water than the sheets possess at the corresponding stage of manufacture of conventional thin, dense asbestos-cement shingles by the dry process, in which the percentage of water at this stage is typically about 10 percent. This is significant because the higher water content, which is greater than necessary for cure of the hydraulic cement, assures more voids and lower density in the final product. The green sheets are removed from the conveyor belt 207, which is the fifth conveyor belt in the process line, and are stacked and allowed to air cure for a period of about 3 days or more. Time of this order is required for air curing, which is carried out at room temperature and humidity. The wet sheets are stacked on wooden pallets with a plurality of sheets, say 8 to 10, in each stack, and a plurality of stacks, usually 6, are placed one above the other in tiers.

A typical tier consists of 6 stacks having 10 sheets each, with wooden boards separating adjacent stacks.

After the stacked uncured sheets have been allowed to air cure for the desired length of time, they are punched to form individual shingles or strips. The sheets are placed on an inclined chute 210 which transports them downwardly at a steep angle, say about 45°. The leading edge of each sheet as it is placed on this chute 210 is the trailing edge of the sheet as it travels through the sheet formation and texturing process previously described. Known asbestos-cement shingle punching machines, such as the machine 211 which is merely indicated diagrammatically can be used. The punching machine indexes one asbestos-cement sheet at a time, holding the sheet at its leading edge and in the case of the siding shingles squaring the sheets so that the butt edge segments 74a, 74b, and 74c are oriented properly with respect to the texture bands of the corresponding shingle tabs, and also so that the ends of the shingle strips are properly oriented with respect to the tabs. The punching machine also cuts the sheet into lengths which are equal to the desired distance between the head edge and the butt edge of the finished shingle. A small amount of asbestos-cement material, for example, about 1 inch, at the leading edge of each sheet and between successive shingles, is ground for use as rework material. This is desirable because the leading edge of the sheet is marked by the device which restrains the sheet from forward movement on the belt 210 as it is being punched. Each sheet, after it is punched, is transferred from the downwardly sloping chute 210 to an upwardly sloping conveyor belt 212. All of the trim asbestos-cement, coming from the discharge end of belt 212 is ground for use as rework material.

After punching of the sheets into individual shingles or strips, two modifications of the process may be made, depending on whether the shingles are to be used for siding or for roofing.

Roofing shingles are treated with a bloom inhibitor, which retards the formation of bloom on the surface of the sheet. To this end, the roofing shingles are transferred from the upwardly sloping conveyor belt 212 to another upwardly sloping conveyor belt 213, sloped at a slightly smaller angle, and from there to a horizontal conveyor belt 214, where the bloom inhibitor is applied. The second upwardly sloping conveyor belt 213 may be omitted if desired. As the air cured asbestos-cement shingles or strips travel along conveyor belt 214, they are heated to a temperature in the range of 100° F. to 150° F., in heater 216, sprayed with bloom inhibitor at spraying station 217 and then rapidly dried on heater 218. The appearance of bloom in asbestos-cement shingles is a known phenomenon, and conventional bloom inhibitors may be used to prevent bloom formation. Before applying the bloom inhibitor, the sheet must be heated to a surface temperature of about 100 to 110° in heater 216.

A bloom inhibitor which has been found to give excellent results is "Rhoplex AC–73," which is made and sold by Rohm and Haas. Other known bloom inhibitors can also be used with satisfactory results.

Siding shingles are not treated with a bloom inhibitor. Such treatment is unnecessary, for they are subsequently painted. Instead, siding shingles are conveyed directly from upwardly sloping conveyor belt 212 to a stacking apparatus, bypassing the horizontal conveyor belt 214 where bloom inhibitor is applied.

Roofing shingles are stacked after application of the bloom inhibitor. Both roofing shingles and siding shingles are stacked at stacking station 219.

Stacks of shingles and strips are taken from the stacking station 219 for steam curing. Steam curing is carried out in an autoclave 220 using steam at a pressure of about 40 to about 150 p.s.i.g., corresponding to about 285° F. to about 365° F. The length of time for curing varies generally inversely with the temperature, and is generally in the range of about 8 to 12 hours. The steam cured shingles are dried in a dryer 221. Before drying, the steam cured shingles generally have a moisture content of about 35 to 40% on the dry basis. This moisture content is reduced to an amount in the range of about 15 to 20% on the dry basis in the case of roofing shingles, and to about 6 to 8% on the dry basis in the case of siding shingles. A somewhat higher drying oven temperature is used for siding than for roofing shingles. For example, both siding and roofing shingles may be dried in a continuous drying oven through which the steam cured shingles and strips are moved at desired speeds, which in both cases may be approximately 70 slabs per minute. A three-zone oven is preferred. In the case of roofing shingles, the air temperature in the oven may be about 300° F. in the first zone, about 250° F. in the second zone, and about 200° F. in the third zone. A considerably higher air temperature, is preferred in the case of siding, for example, about 500° F. higher for each of the respective zones. A moving air current is used throughout the drying process.

The handling and packaging of steam cured roofing shingles differs somewhat from the handling and packaging of steam cured siding shingles. FIG. 15 illustrates the steps in handling and packaging of roofing shingles. As shown therein, the only steps required are cutting of the vertical edges, which is done with a suitable saw, and packaging of the shingles.

The handling of the siding shingles is slightly more complex, as may be seen in FIG. 16. This figure is a flow diagram of the steps for handling steam cured siding shingles. First, the shingle is scored by means of a saw to produce the generally rectangular channels 80 previously described with reference to FIG. 3. At the same time the preferred rectangular cuts are ⅛ inch deep and ⅛ inch wide and hence extend through the veneer layer and into the body of the shingle. Simultaneously with scoring, the newly formed channel, in the case of shingles to be painted in light colors, is painted with a dark paint so as to prime the bottom and side walls of the channel and to give a shadow effect which simulates the shadow appearance which one would expect to find between adjacent separate shingles.

Referring now to FIG. 17, a process for building up grain roll sleeves for imparting a textured surface to the asbestos-cement sheet is illustrated diagrammatically. Steps (a) through (f) in the drawing illustrate the process steps. First of all, a master sheet is prepared. Even before the master sheet can be prepared, a model wood grain for this master sheet must be prepared. A preferred technique is first to carve the desired wood grain pattern in a wooden block 230 which is slightly larger than the desired master sheet. As the pattern is carved in the wood block, all of the desired characteristics, including swirls in the grain, and asymmetrical ridges and grooves similar to those actually found in wooden shingles and shakes, are carved in the wood block. The texture in the wood carving must be bolder than that desired in the shingles, for some loss of texture depth is experienced in transfer of texture to a single. The spacing between adjacent ridges in the wood grain pattern is the same in the wooden block as in the finished shingle, but the grooves in between the ridges are much steeper in the wood block, and are essentially the same in all stages of pattern fabrication. The wood block is a positive; i.e., the pattern in the wood block is substantially the same as the pattern in a shingle.

An impression of the wood block grain pattern is then made using a material which can easily be applied to and stripped from the wood block while accurately maintaining the pattern. Certain types of silicone rubbers, especially the room temperature vulcanizing types, are excellent for this purpose. Uncured silicone rubber in liquid form is poured onto the surface of the wood block having the carved wood grain pattern. This silicon rubber is allowed to cure, into a sheet 231, (see step (a)) and then is stripped off the wood block. The stripped off silicone rubber sheet 231 is turned over so that the pattern is face up, as shown in step (b), and a thin layer of an epoxy resin, such as "Maraset 612B," made by the Marblette Company, is then poured onto the silicon rubber sheet. A dam is constructed around the periphery of the silicon rubber sheet before the epoxy resin is poured. This epoxy resin sets to form a sheet 232.

It is necessary, in order to make asbestos sheets which are not prone to scuffing and in order to have uniform roll pressures in the process line previously described, to insure that a substantial number of the ridges in the asbestos-cement sheet generally lie approximately in a common plane, and that those ridges which do not lie in this common plane lie below it and not above it. Naturally, it is not feasible to carve the wood block so precisely that all its ridges lie in a common plane. The deviations from the common plane which are characteristic of the wood block are also transferred to the silicone rubber sheet, and in turn to the epoxy sheet. At this point in the process, the variations in the height of the ridges are leveled out, as shown in step (c), so that a substantial number of them do lie in a common plane, with those out of line being below this plane. This is done by placing the epoxy sheet 232, at an elevated temperature sufficient to soften the sheet but not to cause plastic flow, face down on a flat plate 233 of a suitable material, such as steel. A felt or other absorbent backing sheet 234 is placed on top of the epoxy sheet, one or more flat plates of steel 235 or other smooth-surfaced material, are placed on the felt, and then weights sufficient to level the ridges are placed on this sheet. Force may be applied by means other than the application of weights as desired to provide pressures of 5-10 p.s.i. This leveling out of the ridges in the wood grain causes minor undulations in the back surface of the epoxy sheet.

A new level back surface is then formed on the epoxy sheet while the pattern surface remains face down on a plate or slab having a flat surface, as shown in step (d). Additional epoxy resin 236 is poured on top of the epoxy sheet 235, and hardens to form a single built-up sheet 237. This built-up epoxy sheet 237 is the master from which the patterns on the individual shingles are prepared. This master, which is a comparatively fragile flat sheet, is a positive. The texture pattern is considerably deeper in this master than it is in the product shingles. The depth of the textures in the product shingles is perhaps as much as 25 percent less than that of the master.

A roll sleeve 235 is prepared from the epoxy master sheet by pouring flexibilized epoxy resin, i.e., an epoxy resin of a type which remains flexible even at room temperature for a period of about 24 to 48 hours onto the textured surface of the epoxy master sheet. This is shown in step (e). The roll sleeve 238 is bent at room temperature so that its two edges substantially touch each other, with a small gap 239 not exceeding about ½ inch, and is adhered to the steel roll with a contact cement. This bending is carried out on the upper grain roll 202. (See step (f)) the gap may be filled in by means of a quick setting thermoplastic resin, for example, a suitable epoxy resin, in which an appropriate texture may be tooled to make the pattern appear continuous. The texture roll 202 now has a removable and replaceable sleeve containing the desired wood grain texture pattern. Asbestos-cement sheets are then embossed with this pattern as already described.

EXAMPLE I

Roofing shingles were made by the dry process illustrated in FIG. 14.

A raw material base furnish, recycled uncured material, and air-cured rework (reprocessed asbestos-cement stock) were used to make up the base furnish. The raw material base furnish had the following compositions, in percent by weight:

| | Percent |
|---|---|
| Asbestos fiber (Grade 4) | 17.1 |
| Expanded perlite (Johns-Manville PA 151) (density 3 p.c.f.) | 12.8 |
| Hydraulic cement (Blaine surface area 3800 cm.²/gram) | 37.6 |
| Newsprint | 10.2 |
| Pigment (carbon black) | 0.6 |
| Calcium silicate ("Micro-Cel E") | 1.1 |
| Silex (ground silica −200 mesh) | 20.6 |

The newsprint was overissue newsprint which was dry shredded, mixed with an equal weight of water and fiberized in a hammer mill prior to admixture with the other ingredients. The rework and all of the ingredients of the base furnish except perlite were mixed together in mixer 160 and ground in grinder 161. The perlite, plus recycled uncured asbestos-cement stock obtained from the shingle production described herein, were added to the other ingredients in mixing tank 162. The amount of rework stock was 30 percent of the combined weight of rework and dry solids weight of raw material furnish. The entire base furnish was split into two portions, the primary portion constituting two thirds of the total weight and secondary portion constituting one third of the total weight. The primary portion was deposited in the form of a layer on conveyor 166 through fluff box 164, and the secondary portion was deposited as a layer on top of the primary layer. About 40 percent by weight of water, based on the total weight of dry solids furnish, was added on the conveyor belt. Marble dust of approximately 80 mesh particle size was added as a parting agent to the surface of the base stock on the belt. The amount of marble dust was about 0.1 pound per hundred square feet of surface. The asbestos-cement base stock layer on the belt was cut into lengths of 101 inches each.

A veneer furnish having the following composition, in percent by weight (dry solids basis) was prepared as follows:

| | Percent |
|---|---|
| Asbestos fiber (Grade 7) | 14.5 |
| Grey cement | 37.5 |
| Silex (minus 200 mesh) | 21.8 |
| Whiting (calcium carbonate) | 10.9 |
| Sand (80 mesh) | 7.3 |
| Black iron oxide pigment | 3.0 |
| Umber iron oxide pigment | 5.0 |

The veneer was deposited in the amount of 2.5 ounces per square foot on top of the base layer on the conveyor belt. Five percent of the total process water was added after the addition of the veneer furnish. After depositing the veneer, 5.5 pounds of crushed stone granules of 10–60 mesh size per 100 square feet of surface were added in granule applicator 181a. A portion of these granules could be seen on the surface of the finished product.

Perforated rolls 171 and 181, with the addition of weights, applied pressures of 85 pounds per lineal inch, and perforated rolls 194 were operated at a pressure of 55 pounds per lineal inch, which was provided by the weight of the rolls alone.

A wood grain texture was applied to the upper surface of the moist green asbestos-cement material on the conveyor belt by means of grain rolls 201, which had a roll pressure of 350 pounds per lineal inch.

The grain roll had a texture sleeve prepared as shown in FIG. 17.

After application of the grain texture, the edges of the uncured sheet were consolidated, the top surface cleaned by a vacuum cleaner, and the sheets were stacked by a stacking machine in pallets loads consisting of stacks disposed one above the other, each stack consisting of ten sheets of asbestos-cement material and a plywood board separating successive stacks. The asbestos-cement sheets were air cured at room temperature and pressure for at least three days in these stacks.

The air cured sheets were divided into shingles 16 x 24¾ inches on a punching machine. These sheets were then heated to a surface temperature of 100 to 110° F., and the surfaces were then sprayed with a bloom inhibitor having the following composition:

"Rhoplex AX–73": 141.0 pounds
"Acrysol GS" (3% aqueous solution): 16.5 pounds
"Nopco 1497V" (3% aqueous solution): 3.0 pounds
Water: 31.0 gallons
Brown pigment: 2.11 pounds The surface of the sheet was then rapidly dried and the shingles were stacked.

The shingles were steam cured for eight hours at 105 p.s.i.g. The autoclave was brought up to maximum pressure over a period of two hours and was returned from maximum to atmospheric pressure over a period of two hours. The shingles were dried to 10–15 percent moisture at 200° F. in a three zone oven through which the shingles moved continuously. The edges of the shingles were cut, and the shingles were then packaged.

The product shingles had an overall density of 55–60 pounds per cubic foot. The base had a density of 50–55 pounds per cubic foot, and the veneer had a density of about 100–110 pounds per cubic foot. The shingles were approximately 0.35 inch thick (average of 10 shingles when stacked) along both the head and the butt edges. The veneer was about 0.025 inch thick.

The depth of texture (i.e., the depth of grooves measured from the higher of the two adjacent ridges) was measured on three shingles by selecting six points at random on each shingle. The average depth of texture was 0.040 inch, the maximum, 0.084 inch; and the minimum, 0.020 inch. The veneer was substantially free from surface cracks and was firmly bonded to the base.

EXAMPLE II

Siding shingles were made by the dry process illustrated in FIG. 14. The base and veneer furnishes had the same composition as in Example I, except for the omission of veneer pigment, in the shingles of Example II, and the process for making, texturing, and air curing the sheets, for punching the sheets into individual shingles, and for measuring the depth of texture was the same as in Example I with the exceptions which will now be noted. Sand having a particle size of 60–80 mesh was used as the parting agent, and was added through granule applicator 200. The sand was added in amounts of 25 pounds per square foot. Following the punching of the sheets into shingles by punching machine 211, the shingles were conveyed directly to stacking station 219 without the application of bloom inhibitor. Steam curing was the same as in Example I, but the shingles were dried to a moisture content of 6 to 8 percent in a three zone drying oven having zone temperatures of 350° F., 300° F., and 250° F.

The steam cured and dried siding shingle was then finished according to the process shown in FIG. 16. Score lines ⅛ inch wide and ⅛ inch deep and perpendicular to the head edge were sawed from the butt edge to the head edge. These score lines were located respectively along the left edge, 10 inches from the left edge, and 6 inches from the right edge of the shingle. The shingles were then preheated to 125° F. and painted with a water base emulsion type acrylic paint and heated to fuse the resin particles at 325° F., and were packaged.

Densities (overall, base, and veneer) and veneer thicknesses were the same as in Example I.

The depth of texture was measured on these shingles at six places selected at random on each shingle. The average depth of texture was 0.035 inch; the maximum, 0.060 inch; and the minimum, 0.008 inch. The veneer was substantially free from surface cracks and was firmly bonded to the base.

EXAMPLE III

The procedure of Example I was followed with similar results in the eleven runs in this example, except that the respective base furnish compositions were as shown in Table I.

wood grain pattern under normal weathering conditions.

| Materials | Run number | | | | | | | | | | |
|---|---|---|---|---|---|---|---|---|---|---|---|
| | 1 | 2 | 3 | 4 | 5 | 6 | 7 | 8 | 9 | 10 | 11 |
| Asbestos fiber (Grade 4) | 5.7 | 8.6 | 11.4 | 14.3 | 17.1 | 20.1 | 22.9 | 25.7 | 28.6 | 10.8 | 17.1 |
| Perlite PA 151, 3 p.c.f. | 14.6 | 14.2 | 14.2 | 13.3 | 12.7 | 12.3 | 11.9 | 11.4 | 11.0 | | |
| Perlite PA 151, 8 p.c.f. | | | | | | | | | | 19.5 | |
| Hydraulic cement (Blaine surface area 3,800 cm.²/gm.) | 42.9 | 41.5 | 40.2 | 38.9 | 37.5 | 36.1 | 34.9 | 33.6 | 32.3 | 38.3 | 41.4 |
| Newsprint | 11.6 | 11.3 | 10.9 | 10.6 | 10.2 | 9.9 | 9.4 | 9.2 | 8.9 | 10.4 | 17.2 |
| Carbon black | 0.6 | 0.6 | 0.6 | 0.6 | 0.6 | 0.6 | 0.6 | 0.6 | 0.6 | 0.6 | 0.6 |
| Calcium silicate ("Micro-Cel E") | 1.1 | 1.1 | 1.1 | 1.1 | 1.1 | 1.1 | 1.1 | 1.1 | 1.1 | 1.1 | 1.1 |
| Silex (ground silica—200 mesh) | 23.3 | 22.6 | 21.9 | 21.2 | 20.5 | 19.6 | 19.0 | 18.3 | 17.6 | 20.9 | 22.4 |
| Scrap (air cured) | 42.8 | 42.8 | 42.8 | 42.8 | 42.8 | 42.8 | 42.8 | 42.8 | 42.8 | 40.3 | 42.8 |

EXAMPLE IV

For light colored siding shingles, the process of Example II was followed with similar results, except that white cement was used instead of grey cement, and the pigment was omitted.

The patterns on the shingles in FIGS. 1 and 3 are representative of those which can be produced according to this invention. No two shingles will have precisely the same pattern, except by rare coincidence, and a wide variety of patterns and textures may be created by persons within the skill of the art without departing from the scope of this invention. Simulated wood grain patterns are preferred, because of their aesthetic appeal and their resemblance to natural wood shingles. It will be understood that the unique composition and structure of the covering members of this invention make it possible to produce other deeply textured patterns as well, without departing from the scope of this invention. For example, a slate pattern, which may be preferred by some for roofing shingles, can also be produced in the shingles of this invention.

As already explained, the deep shadow line requires a butt edge which is at least 0.25 inch thick and preferably at least 0.35 inch thick, and this in turn requires that the overall density of the shingle not be about 75 pounds per cubic foot. Past experience in the asbestos-cement shingle art would have suggested that this objective could not be achieved, for it is well known that asbestos-cement compositions having densities appreciably less than about 80 pounds per cubic foot do not have the required weather resistance, and do not have good paint life. Although veneered asbestos-cement tiles and shingles have been known in the art, structures in which the base and the veneer have substantially different densities have not found acceptance for outdoor uses such as roofing and siding shingles. This may be attributed to the fact it has not been heretofore possible to produce a lightweight base having the necessary strength and weathering resistance characteristics for use as a shingle base, even when covered by a veneer. A further difficulty with lightweight asbestos-cement base compositions and even higher density asbestos-cement base compositions, is that attempts to texture the surface after application of the veneer tended to cause cracking of the veneer. In fact, problems have frequently been encountered in applying a crack-free veneer, even with texturing, on a base of substantially lower density.

While the full benefits of this invention are gained only in shingles having base and veneer compositions within the range of this invention, it is also possible to produce the distinctive texturing patterns of this invention, characterized by at least a portion of the grooves being asymmetrical and therefore appearing to face to one side or the other rather than perpendicular to the shingle and in other shingles besides those having the precise composition and structure herein described. However, it is essential in all cases that the overall density of the shingles not be greater than about 75 pounds per cubic foot, in order to make possible the desired butt edge thickness of at least 0.25 inch without excessive weight; and it is also necessary that the surface or veneer of the shingle have sufficient hardness, strength, and erosion resistance to retain the Other modifications within the scope of this invention will be apparent to those skilled in the art.

While this invention has been described with reference to specific embodiments thereof, it is understood that these are merely by way of illustration and that the scope of this invention shall not be limited except by the claims.

What we claim is:

1. An asbestos cement exterior covering member for buildings, said covering member having front and back surfaces and also having head and butt edges, the thickness of said covering member along its butt edge being not less than 0.25 inch, said covering member having an overall density in the range of about 40 to 75 pounds per cubic foot, said covering member comprising
   (a) a base having a density in the range of about 35 to 70 pounds per cubic foot, said base being a hydrothermal reaction product of a mixture comprising about 3 to 30 percent by weight of asbestos fiber, about 25 to 45 percent by weight of hydraulic cement, about 10 to 25 percent by weight of silica, and about 5 to 20 percent by weight of cellulose, based on the total dry solids weight of raw material furnish; and
   (b) a veneer covering one surface of said base, the exposed surface of the veneer constituting the front surface of the shingle, said veneer having a thickness of about 0.01 to about 0.03 inch and a density of about 80 to about 120 pounds per cubic foot, said veneer being a hydrothermal reaction product of a mixture comprising about 3 to 30 percent by weight of asbestos fiber, about 25 to 45 percent by weight of hydraulic cement, and about 10 to 25 percent by weight of silica, based on the total dry weight of solids raw material veneer furnish.

2. A covering member according to claim 1 in which the mixture forming said base contains about 5 to 20 percent of an inorganic bulking agent.

3. A covering member according to claim 2 in which said inorganic bulking agent is expanded perlite.

4. A covering member according to claim 1 in which said cellulose is fiberized.

5. A covering member according to claim 1 in which said hydraulic cement is portland cement.

6. A covering member according to claim 1 in which said mixture forming said veneer contains about 5 to 25 percent of calcium carbonate whiting.

7. A shingle for siding, roofing and the like having substantially planar back surface, a textured weather surface and having head, butt, left, and right edges, said shingle including a head portion and a butt portion, the thickness of said shingle along its butt edge being at least 0.25 inch, said shingle having an overall density not greater than about 75 pounds per cubic foot and comprising a fiber-cement base having a density not over about 70 pounds per cubic foot and an asbestos-cement veneer layer having a density of 80 to 120 pounds per cubic foot, the outer surface of the veneer layer constituting the weather surface of the shingle, the veneer layer being about 0.01 to about 0.03 inch thick and the depth of texture on said weather surface being from about 0.005 to about 0.10 inch, said texture being formed by a multiplicity of grooves simulating a natural wood grain pattern, said grooves running generally from the head edge to the butt edge of the shingle and giving the general appearance of parallelism without adjacent grooves necessarily being continuously parallel or uniformly spaced apart throughout their lengths, each of said grooves being formed by a pair of sloping flanks, the first of said flanks sloping downwardly to the right and the second of said flanks sloping downwardly to the left, the first flanks of at least some adjacent grooves being generally parallel to each other, the flanks of said grooves in at least one portion of said weather surface having unequal slope angles.

8. A shingle according to claim 7, said base being a hydrothermal reaction product of a mixture comprising about 3 to 30 percent by weight of asbestos fiber, about 25 to 45 percent by weight of hydraulic cement, about 10 to 25 percent by weight of silica, about 5 to 20 percent by weight of inorganic bulking agent, and about 5 to 20 percent by weight of fiberized cellulosic material, based on the total dry weight of solids raw material base furnish, and said veneer layer comprising the hydrothermal reaction product of a mixture comprising about 3 to 30 percent by weight of asbestos fiber, about 25 to 45 percent by weight of hydraulic cement, and about 10 to 25 percent by weight of silica, based on the total dry weight of solids raw material veneer furnish.

9. A nailable, sawable, and substantially incombustible shingle for siding, roofing, and the like, said shingle having a thickness not less than 0.25 inch at the butt edge and having an overall density in the range of about 40 to 75 pounds per cubic foot, said shingle comprising an asbestos-cement base having a density in the range of about 35 to 70 pounds per cubic foot, and a veneer layer covering one side of said base and forming a textured front face of the shingle providing a reference plane, said veneer layer having a density in the range of about 80 to 120 pounds per cubic foot, the outer surface of said veneer layer having a plurality of grooves forming a simulated wood grain pattern, said grooves being formed by pairs of intersecting sloping flanks and giving the general appearance of parallelism but without adjacent grooves necessarily being parallel throughout their lengths, at least a portion of said grooves being formed by flanks having unequal widths and unequal angles of slope with respect to the said reference plane.

10. A nailable, sawable and substantially incombustible shingle for siding, roofing, and the like, said shingle having a thickness not less than 0.25 inch and having an overall density in the range of about 40 to 75 pounds per cubic foot, said shingle comprising an asbestos-cement base having a density in the range of about 35 to 70 pounds per cubic foot and an asbestos-cement veneer layer covering one side of said base and having a density in the range of 80 to 120 pounds per cubic foot, said veneer layer having a textured outer surface in which the depth of texture is in the range of about 0.005 to about 0.10 inch.

11. A nailable, sawable, and substantially incombustible shingle for siding, roofing, and the like, said shingle having a thickness not less than 0.25 inch and having an over-all density in the range of about 40 to 75 pounds per cubic foot, said shingle comprising an asbestos-cement base having a density in the range of about 35 to 70 pounds per cubic foot, and an asbestos-cement veneer layer covering one side of said base and having a density in the range of 80 to 120 pounds per cubic foot, the outer surface of said veneer layer having a plurality of grooves forming a simulated wood pattern, each of said grooves being formed by a pair of intersecting sloping flanks, at least some of said grooves being of unequal depth and giving the general appearance of parallelism but without adjacent grooves being parallel throughout their lengths, said grooves having depths in the range of about 0.005 to about 0.10 inch.

References Cited
UNITED STATES PATENTS

| | | | |
|---|---|---|---|
| 1,663,905 | 3/1928 | Dietz | 52—316 |
| 2,149,741 | 3/1939 | Miles | 52—558 |
| 2,187,203 | 1/1940 | Johnston | 52—316 |
| 2,348,223 | 5/1944 | Papesh | 52—557 |
| 2,380,885 | 7/1945 | Wack | 52—316 |
| 2,946,158 | 7/1960 | Seipt | 52—612X |

JOHN E. MURTAGH, Primary Examiner

U.S. Cl. X.R.

52—314, 612; 264—241

PO-1050
(5/69)

UNITED STATES PATENT OFFICE
CERTIFICATE OF CORRECTION

Patent No. 3,608,261                    Dated September 28, 1971

Inventor(s) Clayton V. French, et al

It is certified that error appears in the above-identified patent and that said Letters Patent are hereby corrected as shown below:

Column 8, lines 33 and 34, change "Slops" to --slopes--; line 38, change "plain" to --plan--; column 15, line 56, change "the" to --they--; column 16, line 18, change "an" to --any--; column 20, line 65-66, line left out after "containing" --two or more tabs, and of various desired lengths, taking--; column 31, line 38, change "about" to --above--.

Signed and sealed this 9th day of January 1973.

(SEAL)
Attest:

EDWARD M. FLETCHER, JR.
Attesting Officer

ROBERT GOTTSCHALK
Commissioner of Patents